(12) United States Patent
Meyers

(10) Patent No.: US 8,838,308 B2
(45) Date of Patent: *Sep. 16, 2014

(54) TWO WHEELED VEHICLE WITH MODULAR FEATURES

(75) Inventor: Eric Vaughn Meyers, Portland, OR (US)

(73) Assignee: BOXX Corp., Portland, OR (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/117,602

(22) Filed: May 27, 2011

(65) Prior Publication Data

US 2011/0295454 A1    Dec. 1, 2011

Related U.S. Application Data

(63) Continuation-in-part of application No. 13/042,898, filed on Mar. 8, 2011, and a continuation-in-part of application No. 13/042,932, filed on Mar. 8, 2011, now Pat. No. 8,706,331.

(60) Provisional application No. 61/349,015, filed on May 27, 2010.

(51) Int. Cl.
*B60L 11/00*     (2006.01)

(52) U.S. Cl.
USPC ............ 701/22; 701/82; 700/94; 700/286; 280/5.51; 280/47.26; 280/79.11; 174/53; 440/84; 180/65.1; 315/224; 315/291; 290/44 C; 386/52; 235/375

(58) Field of Classification Search
USPC ............ 701/22, 82; 700/94, 286; 280/5.51, 280/47.26, 79.11; 174/53; 440/84; 180/65.1; 315/224, 291; 290/40 C; 386/52; 235/375

See application file for complete search history.

(56) References Cited

U.S. PATENT DOCUMENTS

| | | |
|---|---|---|
| 1,924,363 A | 8/1933 | Kanai |
| D92,777 S | 7/1934 | Stutsman et al. |
| D144,077 S | 3/1946 | Shaffer |
| D195,075 S | 4/1963 | May |
| 3,096,841 A | 7/1963 | May |
| 3,316,993 A | 5/1967 | Weitzner |
| D231,441 S | 4/1974 | Tratner |
| 3,934,669 A | 1/1976 | Adams |

(Continued)

OTHER PUBLICATIONS

Definition of word "rotatably" from Webster's (1 page).*

(Continued)

*Primary Examiner* — James Trammell
*Assistant Examiner* — Sanjeev Malhotra
(74) *Attorney, Agent, or Firm* — Harness, Dickey & Pierce, P.L.C.

(57) ABSTRACT

A two wheeled vehicle includes a main body, a first wheel that is coupled to the main body, and a second wheel that is coupled to the main body. The vehicle also includes a motor that is supported by the main body and that drives at least one of the first and second wheels in rotation relative to the main body. Moreover, the vehicle includes a controller assembly including a controller and a controller housing. The controller is operable to control the motor to thereby control driving rotation of the at least one of the first and second wheels. The controller is housed within the controller housing, and the controller housing is coupled to the main body. The controller and the motor are in severable but operable communication when the controller housing is coupled to the main body.

20 Claims, 11 Drawing Sheets

(56) References Cited

U.S. PATENT DOCUMENTS

| | | | |
|---|---|---|---|
| D245,324 S | 8/1977 | Adams | |
| 4,094,374 A | 6/1978 | Adams | |
| 4,702,340 A | 10/1987 | Hamilton | |
| 4,895,385 A | 1/1990 | Becoat | |
| 5,004,258 A | 4/1991 | Becoat | |
| 5,054,572 A | 10/1991 | Parker | |
| D323,306 S | 1/1992 | Brummer | |
| 5,097,922 A | 3/1992 | Stagi | |
| 5,113,964 A | 5/1992 | Yamauchi | |
| 5,116,070 A | 5/1992 | Becoat | |
| 5,703,327 A * | 12/1997 | Jorgensen | 174/53 |
| 5,894,903 A | 4/1999 | Hieble | |
| 6,273,442 B1 | 8/2001 | Fallon et al. | |
| 6,320,336 B1 | 11/2001 | Eguchi | |
| 6,439,592 B1 | 8/2002 | Christini et al. | |
| 6,457,554 B1 | 10/2002 | Sung | |
| 6,505,699 B1 | 1/2003 | Christini et al. | |
| 7,328,766 B2 | 2/2008 | Christini et al. | |
| 7,487,654 B2 | 2/2009 | Christini et al. | |
| 2001/0030400 A1 * | 10/2001 | Zetterstrom | 280/5.51 |
| 2002/0103580 A1 * | 8/2002 | Yakes et al. | 701/22 |
| 2002/0125669 A1 * | 9/2002 | Chang | 280/79.11 |
| 2002/0148656 A1 | 10/2002 | Li | |
| 2003/0027468 A1 * | 2/2003 | Into | 440/84 |
| 2004/0051264 A1 * | 3/2004 | Koronowski et al. | 280/47.26 |
| 2004/0133332 A1 * | 7/2004 | Yakes et al. | 701/82 |
| 2004/0188153 A1 * | 9/2004 | Liu et al. | 180/65.1 |
| 2004/0212321 A1 * | 10/2004 | Lys et al. | 315/291 |
| 2005/0119806 A1 * | 6/2005 | Nasr et al. | 701/22 |
| 2005/0133282 A1 | 6/2005 | Huang et al. | |
| 2005/0253533 A1 * | 11/2005 | Lys et al. | 315/224 |
| 2006/0066109 A1 * | 3/2006 | Nasr | 290/40 C |
| 2007/0055409 A1 * | 3/2007 | Rasmussen et al. | 700/286 |
| 2008/0167738 A1 * | 7/2008 | Lee | 700/94 |
| 2009/0169169 A1 * | 7/2009 | Nakajima et al. | 386/52 |
| 2010/0276482 A1 * | 11/2010 | Raihi et al. | 235/375 |

OTHER PUBLICATIONS

Definition of word "drivingly" from Webster's (1 page).*
Definition of word "removably" from Webster's (1 page).*
Definition of word "rotatably" from Webster's (1 page), printed on Apr. 12, 2013 showing: "No results found in the 1913 edition or the 1828 edition". (already provided with OA mailed out on Apr. 22, 2013).*
Definition of word "drivingly" from Webster's (1 page), printed on Apr. 12, 2013 showing: "No results found in the 1913 edition or the 1828 edition". (already provided with OA mailed out on Apr. 22, 2013).*
Definition of word "removably" from Webster's (1 page), printed on Apr. 12, 2013 showing: "No results found in the 1913 edition or the 1828 edition". (already provided with OA mailed out on Apr. 22, 2013).*
BMW previews its vision of a safer city scooter with C1-E concept—Autoblog, http://www.autoblog.com/2009/10/06/bmw-previews-its-vision-of-a-safer-city-scooter-with-c1-e- . . . , 20 pages, accessed on Jul. 15, 2010.
The Inside Story of the MotoCzysz E1pc, the World's Most Advanced Electric Motorcycle—Popular Science, http://www.popsci.com/cars/article/2010-06/inside-story-motoczysz-elpc-worlds-most-advanced-electric-motorcycle, 16 pages, accessed on Jun. 22, 2010.
Watch a Guy Make His Own Bike Lane With a Pico Projector—Gizmodo Australia, http://www.gizmodo.com.au/2011/05/watch-a-guy-make-his-own-bike-lane-with-a-pico-pr . . . , 4 pages, accessed on May 24, 2011.
ZAP's New All-Wheel Electric Mini Dirt Bike—ZAP! Electric Vehicles, http://www.zapworld.com/node/767, 1 page, accessed on May 12, 2010.
Rokon Two Wheel Drive Motorcycle, Best Off Road Vehicle, About Rokon, http://www.rokon.com/about/index.htm, 3 pages, accessed on Jul. 29, 2011.
LightLane Design, http://www.lightlanebike.com/design_01.html, 1 page, accessed on Jul. 29, 2011.
Report smart to reveal electric scooter at Paris Motor Show—Autoblog Green, http://green.autoblog.com/2010/07/14/report-smart-to-reveal-electric-scooter-at-paris-motor-show/,8 pages, accessed on Jul. 29, 2011.
International Search Report dated Sep. 21, 2011, International Application No. PCT/US2011/038405, International Filing Date May 27, 2011.
Written Opinion dated Sep. 21, 2011, International Application No. PCT/US2011/038405, International Filing Date May 27, 2011.

* cited by examiner

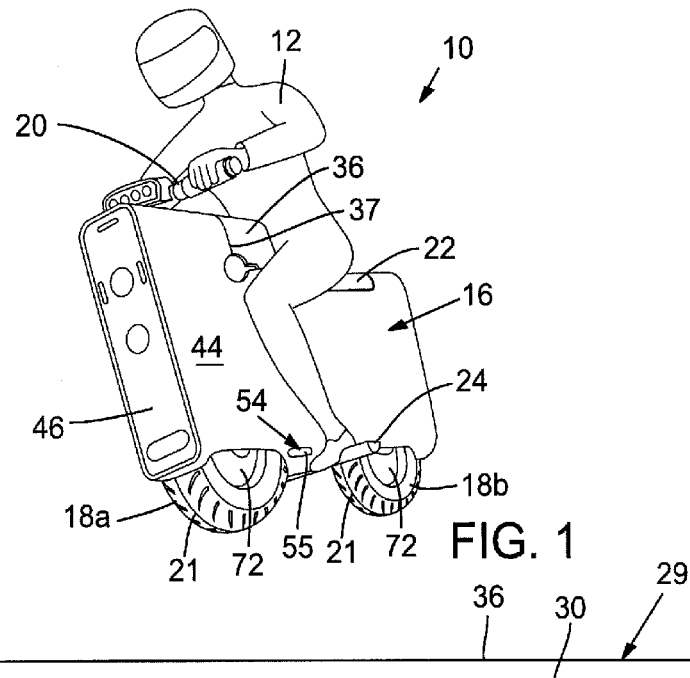
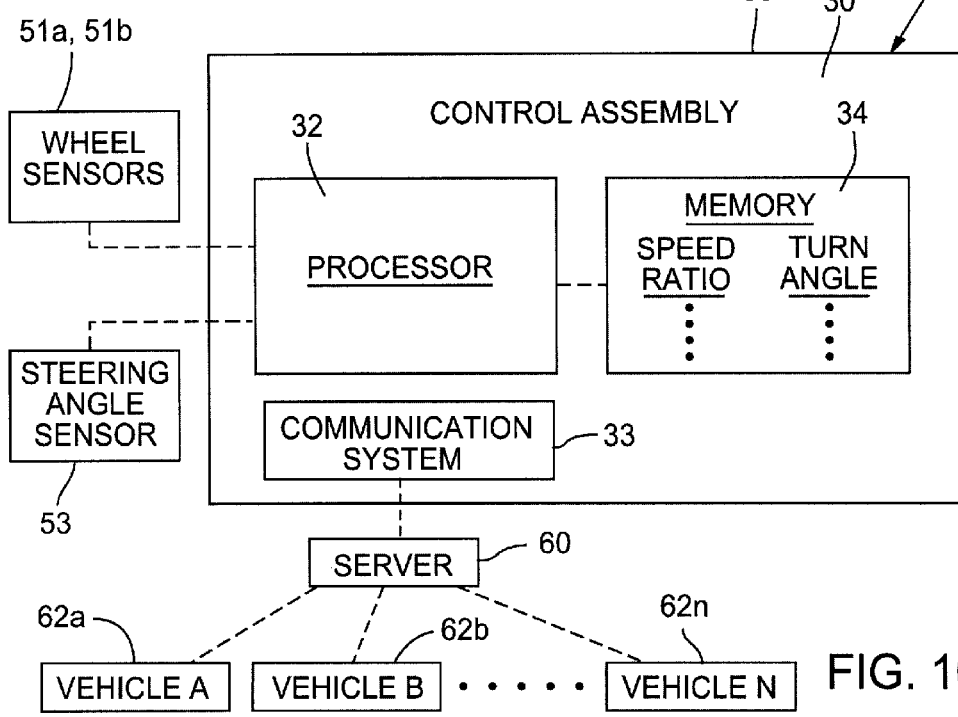
FIG. 1
FIG. 10

TWO WHEELED VEHICLE WITH MODULAR FEATURES

CROSS-REFERENCE TO RELATED APPLICATIONS

This application claims the benefit of U.S. Provisional Application No. 61/349,015, filed on May 27, 2010.

This application is also a continuation-in-part application of U.S. patent application Ser. No. 13/042,932, filed Mar. 8, 2011, which claims the benefit of U.S. Provisional Application No. 61/349,015, filed on May 27, 2010.

This application is additionally a continuation-in-part application of U.S. patent application Ser. No. 13/042,898, filed Mar. 8, 2011, which claims the benefit of U.S. Provisional Application No. 61/349,015, filed on May 27, 2010.

The entire disclosure of each of the above applications is incorporated herein by reference.

FIELD

The present disclosure relates to a two wheeled vehicle and, more particularly, relates to a two wheeled vehicle with modular features and components.

BACKGROUND

This section provides background information related to the present disclosure which is not necessarily prior art.

Motorcycles, mopeds, scooters and other two wheeled motorized vehicles are the vehicle of choice for millions of riders. These vehicles can be relatively compact as compared to full size cars and trucks, and therefore, these vehicles can maneuver with relative ease through heavy traffic and other crowded areas.

Also, these vehicles can be relatively lightweight, allowing for quicker accelerations and better handling. Moreover, because these vehicles are relatively low weight, these vehicles can be fairly fuel efficient.

Although conventional two wheeled vehicles have functioned adequately for their intended purposes, several needs remain. For instance, conventional two wheeled vehicles may still be too large to ride in extremely congested areas, too bulky to store in small areas, etc. Also, while these vehicles do provide fuel efficiencies, many of these vehicles still consume substantial amounts of fuel, produce harmful emissions, and the like.

Accordingly, there remains a need for an extremely compact two wheeled motorized vehicle that is even more fuel efficient than conventional vehicles. Moreover, there remains a need for one or more safety features for a two wheeled motorized vehicle of this type. In addition, there remains a need for a configurable vehicle of this type. Still further, there remains a need for a vehicle of this type, which can be manufactured efficiently.

SUMMARY

This section provides a general summary of the disclosure, and is not a comprehensive disclosure of its full scope or all of its features.

A two wheeled vehicle is disclosed that includes a main body, a first wheel that is rotatably coupled to the main body, and a second wheel that is rotatably coupled to the main body. The vehicle also includes a motor that is supported by the main body and that drivingly rotates at least one of the first and second wheels. Moreover, the vehicle includes a controller assembly including a controller and a controller housing. The controller is operable to control the motor to thereby control driving rotation of the at least one of the first and second wheels. The controller is housed within the controller housing, and the controller housing is removably coupled to the main body. The controller and the motor are in severable but operable communication when the controller housing is removably coupled to the main body.

Also, a two wheeled vehicle is disclosed that includes a main body, a first wheel that is rotatably coupled to the main body, and a second wheel that is rotatably coupled to the main body. The vehicle also includes an electrical motor that is supported by the main body and that drivingly rotates at least one of the first and second wheels. Moreover, the vehicle includes an electrical power source that is supported by the main body and that provides electrical power to the electrical motor. Still further, the vehicle includes a first electrical connector that is disposed on the main body. The vehicle further includes a controller assembly having a controller that is operable to control the electrical motor to thereby control driving rotation of the at least one of the first and second wheels. The controller assembly also includes a second electrical connector operable to electrically connect with the first electrical connector to establish severable electrical connection between the electrical power source and the controller such that the controller is operable to regulate electrical power provided to the electrical motor to thereby control driving rotation of the at least one of the first and second wheels. Additionally, the controller assembly includes a controller housing that houses the controller therein. The controller housing is removably coupled to the main body, and the second electrical connector and the first electrical connector are removably connected to each other when the controller housing is removably coupled to the main body.

Still further, a two wheeled vehicle having an exterior surface is disclosed. The vehicle includes a main body that defines a first portion of the exterior surface. The vehicle also includes a first wheel that is rotatably coupled to the main body, a first electrical motor that drivingly rotates the first wheel, a second wheel that is rotatably coupled to the main body, and a second electrical motor that drivingly rotates the second wheel. The vehicle further includes an electrical power source that is supported by the main body and that provides electrical power to the first and second electrical motors. Moreover, the vehicle includes a throttle that is supported by the main body. The throttle is operable for selectively regulating output of the first and second electrical motors. Moreover, the vehicle includes a first electrical connector that is disposed on the main body and a controller assembly. The controller assembly includes a controller that is operable to control the first and second electrical motors to thereby control driving rotation of the first and second wheels. The controller assembly further includes a display and a second electrical connector operable to electrically connect with the first electrical connector to establish severable electrical connection between the electrical power source and the controller and between the throttle and the controller such that the controller is operable to regulate electrical power provided to the first and second electrical motors to thereby control driving rotation of the first and second wheels. The controller assembly further includes a controller housing that defines a second portion of the exterior surface and that houses the controller therein. The controller housing is removably coupled to the main body. The second electrical connector and the first electrical connector are removably connected to each other when the controller housing is removably coupled to the main body. Additionally, the controller assembly includes a secondary electrical power source that provides power to the controller assembly when removed from the main body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of an exemplary embodiment of a two wheeled vehicle and rider according to various teachings of the present disclosure;

FIG. 10 is a schematic view of a control assembly of the vehicle of FIG. 1;

Corresponding reference numerals indicate corresponding parts throughout the several views of the drawings.

DETAILED DESCRIPTION

Figure 2:
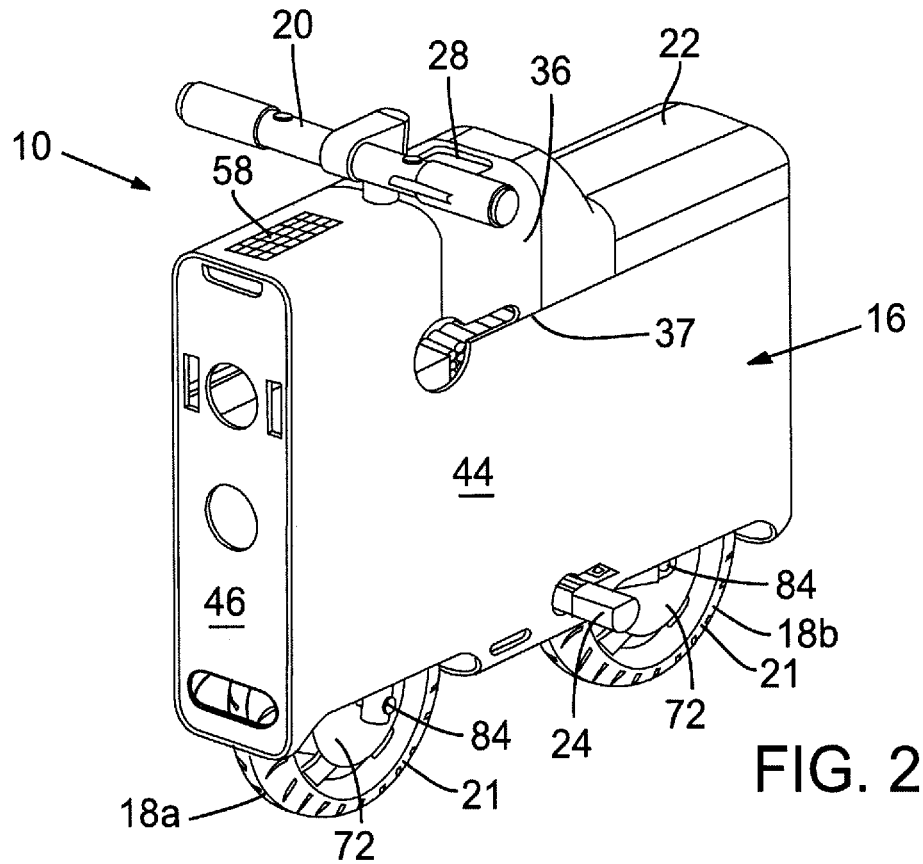
FIG. 2 is a perspective view of the vehicle of FIG. 1.
Figure 3:
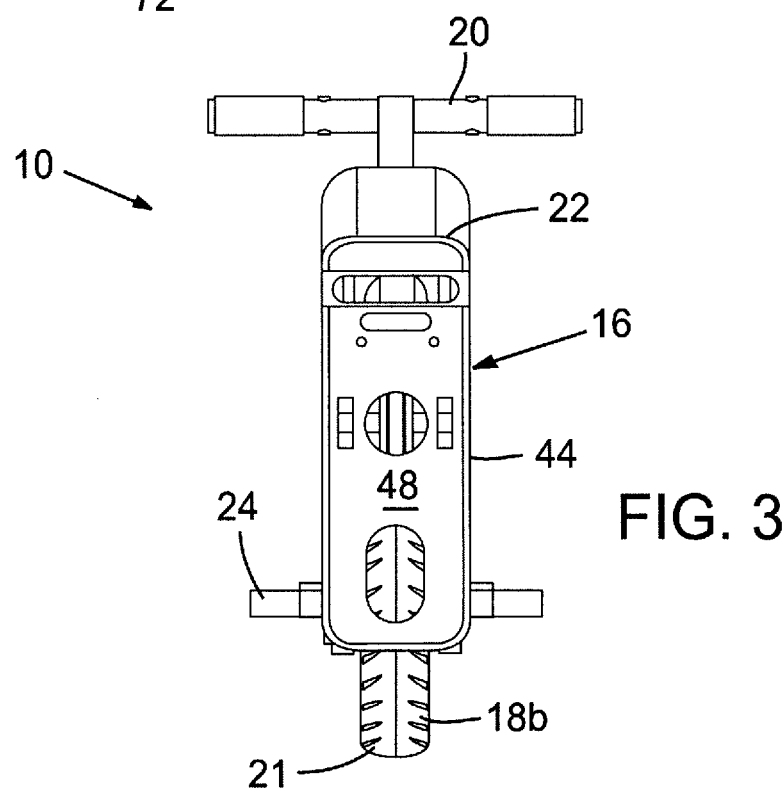
FIG. 3 is a rear view of the vehicle of FIG. 1.
Figure 4:
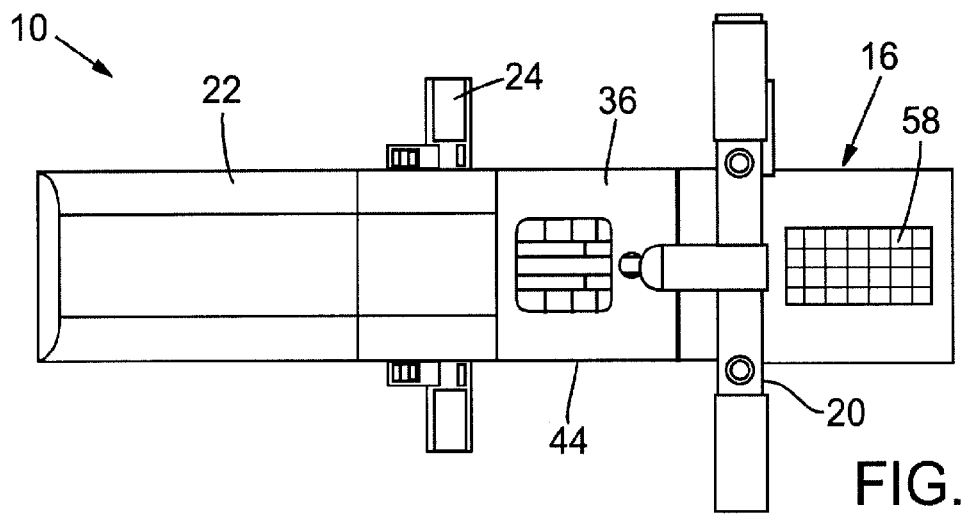
FIG. 4 is a top view of the vehicle of FIG. 1.
Figure 5:
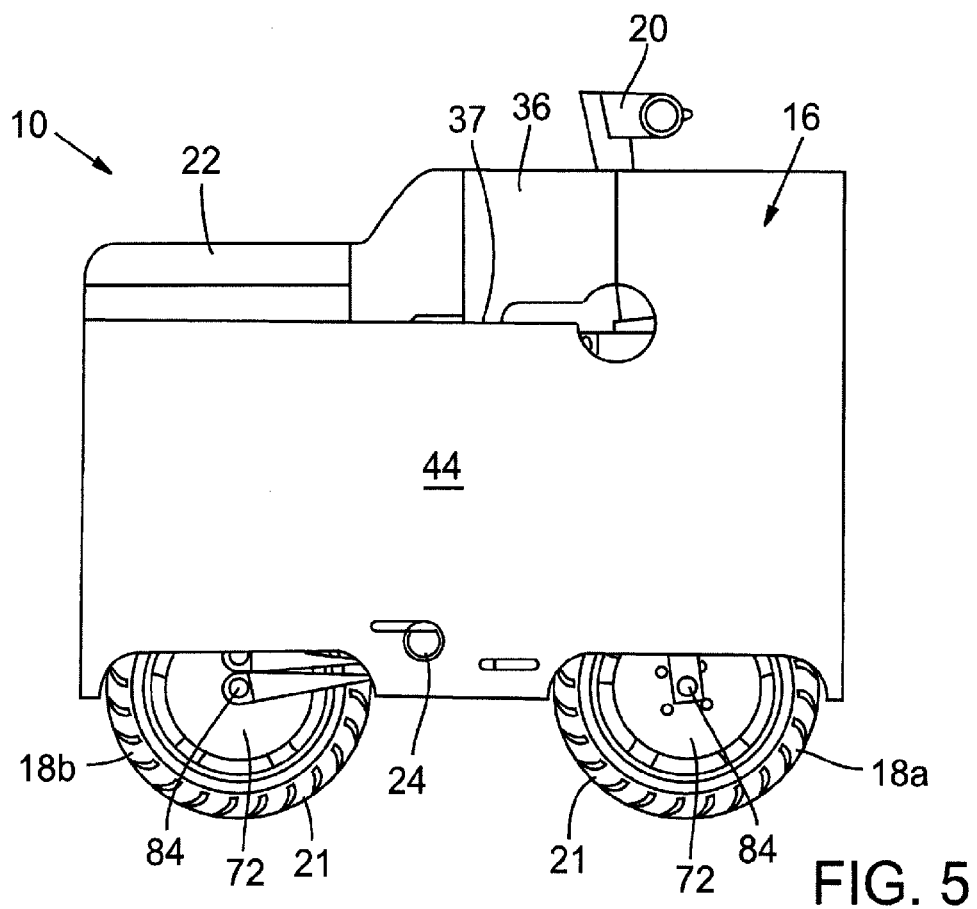
FIG. 5 is a side view of the vehicle of FIG. 1.

Example embodiments will now be described more fully with reference to the accompanying drawings.

Referring initially to FIGS. 1-9, a two wheeled vehicle 10 is illustrated according to various exemplary embodiments. As will be discussed, the two wheeled vehicle 10 can provide convenient transportation for at least one rider 12 (FIG. 1) on surface streets, off-road, or on any other suitable riding surface. The vehicle 10 is illustrated with one rider 12; however, it will be appreciated that the vehicle 10 can be adapted for accommodating more than one rider 12 in some embodiments.

The vehicle 10 can include a main body 14 (FIGS. 6-9) with a frame assembly 15 (FIGS. 6-9) and one or more outer body panels 16 that covers the frame assembly 15 (FIGS. 1-5). The vehicle 10 can also include a control assembly 29 with a controller 30 that is housed by a controller housing 36 (FIG. 10). The controller 30 can communicate with and provide control signals to the various systems of the vehicle 10 as will be discussed. Moreover, the control assembly 29 can be removably coupled to the main body 14 and can be modular as will be discussed. Also, the vehicle 10 can include front and rear wheel assemblies 18a, 18b that are each rotatably coupled to the main body 14. The wheel assemblies 18a, 18b are arranged in a single track fashion similar to a motorcycle, scooter, moped, or motorized bicycle such that the axes of rotation of the wheel assemblies 18a, 18b can be substantially parallel, but spaced apart from each other. In some embodiments, the track of the wheel assemblies 18a, 18b can be substantially aligned with each other when the vehicle 10 travels in a straight line. In other words, the imaginary line tangent to the wheel assembly 18a, 18b and parallel to the direction of travel for each wheel assemblies 18a, 18b can be substantially collinear when the vehicle 10 travels straight. However, in other embodiments, the track of the wheel assemblies 18a, 18b can be offset from each other in a direction parallel to the axis of rotation of the wheel assemblies 18a, 18b. In the latter case, the offset can be as much as 0.25 inches. This offset can provide added stability for the vehicle 10, especially at low speeds, because less work is necessary for balancing the vehicle 10. The offset can also reduce tread/tire wear.

Figure 18:
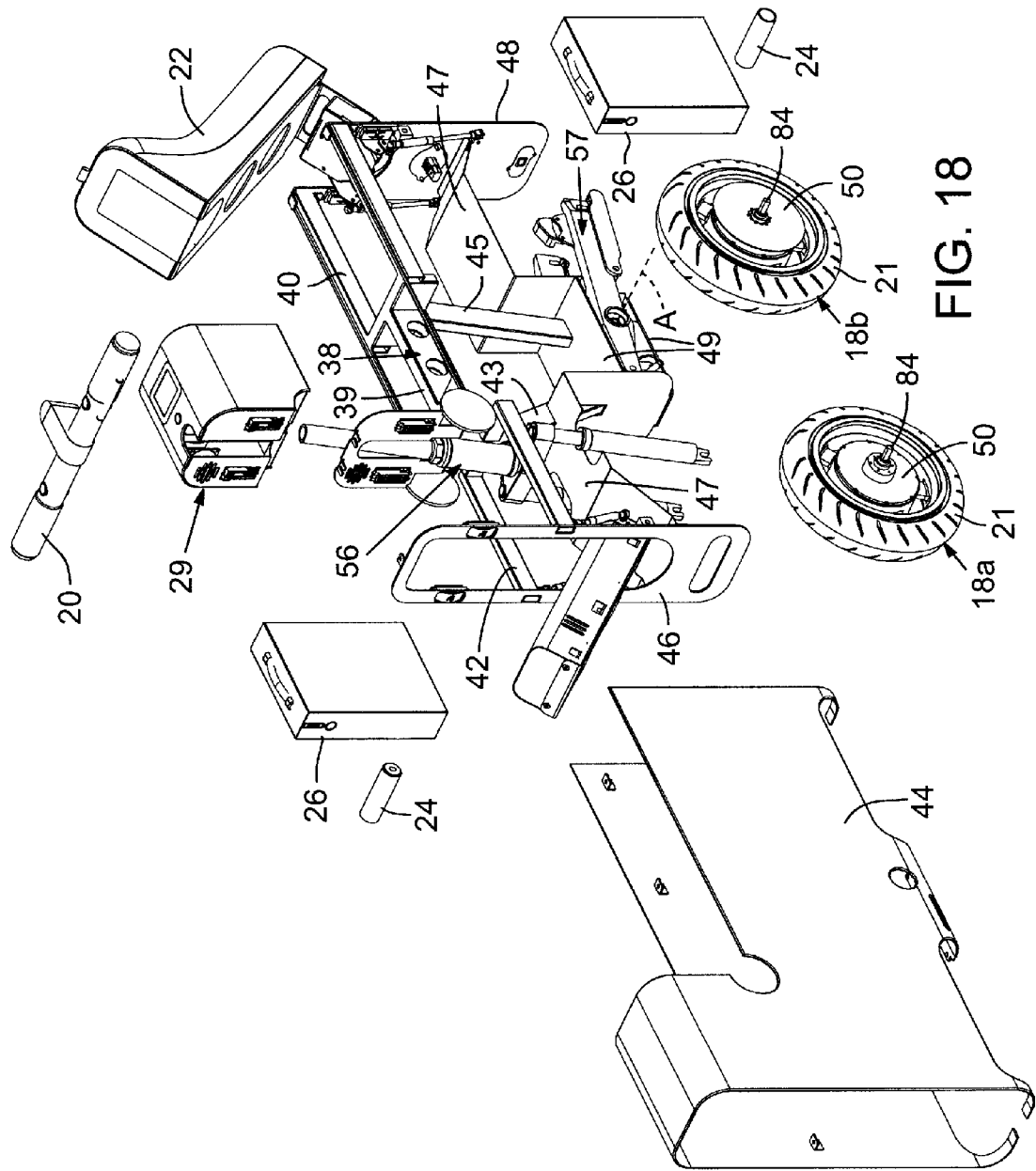
FIG. 18 is an exploded view of the vehicle of FIG. 1.

The wheel assemblies 18a, 18b can extend partially out of the outer body panel(s) 16 and can support the main body 14. Still further, the vehicle 10 can include handlebars 20, a seat 22 on which the rider 12 can be supported, and foot pegs 24 that extend out from the outer body panel(s) 16. As shown in FIG. 18, the handlebars 20 and foot pegs 24 can be removably attached to the main body 14. In some embodiments, the handlebars 20 and foot pegs 24 can be manually detached and attached such that the vehicle 10 can be reconfigured easily. Also, the vehicle 10 can include running boards (i.e., flat platforms that fold out and retract upward, and the feet of the rider can be supported on respective running boards.

The wheel assemblies 18a, 18b can be of any suitable size and type. For instance, the wheel assemblies 18a, 18b can each include a respective tire 21 (e.g., an approximately ten inch diameter tire 21 with a width of approximately four inches). Also, the tires 21 can be airless tires or can be an inflatable tire 21. The wheel assemblies 18a, 18b can be coupled to the vehicle 10 by fasteners or any other suitable means. Thus, the user can replace the wheel assemblies 18a, 18b easily, for instance, due to wear of the tires 21, to include tires 21 that are appropriate for a particular riding surface (e.g., asphalt, gravel, etc.), or for other reasons.

Moreover, the wheel assemblies 18a, 18b can be operably coupled to the main body 14 by a respective suspension system (e.g., shocks, struts, etc.). As will be discussed, the suspension system can allow the center of gravity, axes of rotation, and pivot point of the vehicle 10 to be relatively low to the ground (e.g., between approximately seven (7) and twelve (12) inches from the ground). This can increase stability of the vehicle 10, can allow the vehicle 10 to be relatively compact (e.g., with a relatively short wheel base), and/or can increase cargo space within the vehicle 10.

The vehicle 10 can also include a throttle or other input device that the rider 12 can use to selectively accelerate the vehicle 10. The throttle can be operably coupled or embedded within the handlebars 20. The vehicle 10 can also include one or more motors 50 (FIGS. 11 and 12), which will be described below, and rotation of the throttle can increase output of the motor 50 to drivingly rotate the wheel assemblies 18*a*, 18*b* and accelerate the vehicle 10. The throttle can be mechanically coupled (via a mechanical linkage) to the motor 50, or signals can be transferred from the throttle to the motor 50 via a drive-by-wire system. It will be appreciated that the drive-by-wire system can allow the handlebars 20 to be more self-contained and can allow the throttle to be moved between the left and right handlebars 20 (e.g., to accommodate both right-handed and left-handed riders 12). Moreover, this system can allow the handlebars 20 to be more modular and more easily retracted or folded into or toward the outer body panel(s) 16 or entirely removed from the vehicle 10.

Moreover, one or both wheel assemblies 18*a*, 18*b* can be equipped with a respective braking system (disc brakes, drum brakes, regenerative brakes, DC current injection, etc.). Also, handlebars 20 can include braking controls (e.g., hand brake levers) used to selectively activate the braking system and decelerate the vehicle 10 as will be discussed. Moreover, the vehicle 10 can include an emergency brake for braking the vehicle 10. The brakes can be of any suitable type, such as mechanical brakes, hydraulic brakes, pneumatic brakes, etc. Also, in some embodiments, one or both wheel assemblies 18*a*, 18*b* can include an electric motor used for both drivingly rotating the respective wheel assembly 18*a*, 18*b* and for decelerating the vehicle 10 as will be discussed. The braking system can be physically connected to the controls (brake levers, etc.) or the braking system can be a brake-by-wire system.

The front wheel assembly 18*a* can be steerable and can have a maximum steering angle ranging between approximately ten (10) to thirty-five (35) degrees from center in both directions. For instance, in some embodiments, the maximum steering angle is approximately 18.5 degrees from center in both directions.

In addition, in some embodiments, one or both of the wheel assemblies 18*a*, 18*b* can be selectively retractable within the outer body panel(s) 16 toward and away from the ground. The wheel assemblies 18*a*, 18*b* can be retracted within the body panels 16, for instance, for storage, and the wheel assemblies 18*a*, 18*b* can be extended from the body panels 16, for instance, for riding the vehicle 10. Also, in some embodiments, the vehicle 10 can include a retainer device (not specifically shown) that selectively retains the wheel(s) 18*a*, 18*b* in the retracted position and alternatively in the extended position. Accordingly, the wheel(s) 18*a*, 18*b* can selectively retract within the outer body panel(s) 16 to make the vehicle 10 more compact. Alternatively, one or both wheel assemblies 18*a*, 18*b* can be selectively extended at least partially out of the outer body panel(s) 16, as shown in FIG. 1, in order to rollingly support the vehicle 10. It will be appreciated that the wheel assemblies 18*a*, 18*b* can retract and move in any suitable direction relative to the main body 14 in order to move between the retracted and extended positions. Moreover, the movement of the wheel assemblies 18*a*, 18*b* between the retracted and extended positions can be controlled manually (e.g., by hand) or automatically (e.g., by electrical motors).

In addition, in some embodiments, the handlebars 20 and/or the footpegs 24 can be selectively extendable and retractable. For instance, when the vehicle 10 is going to be stored, the handlebars 20 and/or the footpegs 24 can be retracted (e.g., telescopingly actuated, folded, or otherwise retracted toward and/or inside the outer body panel(s) 16). Then, before use of the vehicle 10, the handlebars 20 and/or the footpegs 24 can be actuated, unfolded, or otherwise extended away from and/or outside the outer body panel(s) 16. This movement can be controlled manually or automatically.

Also, as will be discussed, the vehicle 10 can include an all-wheel-drive system. In other words, the wheel assemblies 18*a*, 18*b* can be independently driven by respective motors and controlled to provide all-wheel drive to the vehicle 10. As will be discussed, the all-wheel-drive system can improve handling, for instance, because the vehicle 10 can have a relatively short wheel base. However, in other embodiments, only one of the wheel assemblies 18*a*, 18*b* is drivingly rotated by a motor. In still other embodiments, both wheel assemblies 18*a*, 18*b* are drivingly rotated by the same motor.

In addition, the vehicle 10 can include a lighting system 17. The lighting system 17 can include any number of devices for emitting light, such as one or more headlights, brake lights, turning signals, and other lights. These lights can include light-emitting diodes (LEDs), fiber optics, lasers, or any other types of light emitting devices. The lighting system 17 can additionally include one or more reflecting devices (e.g., light pipes, panel reflectors, etc.) for directing light from a light source. Also, the power consumption by the lighting system 17 can be relatively low.

Furthermore, the vehicle 10 can include rearview mirrors, for instance, mounted to the handlebars 20. It will be appreciated that these features can be included such that the vehicle 10 can comply with corresponding traffic laws or other rules and regulations.

The vehicle 10 can also include an energy storage device 19 or power source for providing power to the various electrical components of the vehicle 10 (e.g., the lighting system 17, computerized control systems, motor(s), etc.) The energy storage device 19 can be of any suitable type, such as a battery assembly 26, a fuel cell, a capacitor, etc. (i.e., electrical power source), which is schematically illustrated in FIGS. 6-9. Also, as shown in FIG. 18, the battery assemblies 26 can be cube-shaped and can include a handle for portability. The battery assembly 26 can include two battery packs, which can include any suitable number of cells (e.g., lithium-ion cells). For instance, in some embodiments, only one battery pack is used for powering the vehicle 10, and the other battery is a backup battery pack that selectively powers the vehicle 10 when the first battery pack runs low on stored energy. In some embodiments, the vehicle 10 can have a range of approximately eighty miles per charge when driving at approximately twenty miles per hour. Also, in some embodiments, the vehicle 10 can have a range of approximately sixty miles per charge when driving at approximately twenty-five miles per hour. It will be appreciated that the range provided by the battery assembly 26 or other energy storage device 19 can vary (e.g., between 20 miles to 100 miles per charge). Also, in some embodiments, the battery assembly 26 can be removable and replaceable, e.g., with a battery assembly 26 of increased capacity, thereby allowing the user to upgrade the vehicle 10 by extending its range. Additionally, there can be any variable number of battery assemblies 26 (e.g., one to six) included on the vehicle 10 (including a number of spare battery assemblies 26) for extending the range of the vehicle 10.

The battery assembly 26 can be rechargeable. For instance, the vehicle 10 can include a power cord for plugging into a conventional power outlet to thereby recharge the battery assembly 26. Furthermore, if the battery assembly 26 is running low on stored power, the battery assembly 26 can be removed and replaced with a charged battery assembly 26. In addition, the battery assembly 26 can be removed and charged separate from the vehicle 10 in some embodiments. Moreover, in some embodiments, the braking or throttle coasting system for the decelerating the wheel assemblies 18*a*, 18*b* can generate power during use, such that application of the brakes generates electricity, which is transmitted to the battery assembly 26 for storage. In some embodiments, the vehicle 10 can include a charge indicator (not specifically shown) for indicating the remaining charge in the battery assembly 26. The charge indicator can be included on the battery assembly 26 itself, on control assembly 29, and/or on the main body 14 of the vehicle 10. The charge indicator could be a visual signal (e.g., one or more lights indicating charge), an audible signal (e.g., a low-charge alarm), or any other type.

Also, in some embodiments, the vehicle 10 can include one or more solar cells 58 (FIGS. 2 and 4) for converting light and/or heat into energy, which is then used to recharge the vehicle battery assembly 26. The solar cells 58 can also provide power to systems when the vehicle 10 is powered down to thereby maintain standby electronic management of the vehicle 10. The solar cells 58 can be disposed in any suitable location on the vehicle 10 (e.g., on the outer body panel(s) 16, the main body 14, the handlebars 20, as a bezel surrounding other components, etc.). The solar cell 58 can be operated continuously while the vehicle 10 is powered up so that the solar cell 58 continuously supplies energy to the battery assembly 26. Additionally, in some embodiments, the solar cell 58 can be removably connected to the vehicle 10. For instance, the solar cell 58 can be a separate unit that removably and electrically connects to the battery assembly 26 for selective use. As such, the solar cell 58 can be foldable to be more compact when not in use. Also, in some embodiments, the vehicle 10 can include a solar cell 58 that is fixedly connected to the vehicle 10 and an additional solar cell 58 that is removably connected to the vehicle 10, wherein the fixed solar cell 58 continuously charges the battery assembly 26, and the removable solar cell 58 is selectively available for additional charging capability (e.g., when the vehicle 10 is parked and/or powered down). It will be appreciated that the shape of the vehicle 10 can enhance solar power generation because it includes a relatively large surface area available for including solar cells 58.

The vehicle 10 can also include a variety of user control devices, such as a throttle, which is operably coupled to (e.g., embedded in) the handlebars 20. Also, the vehicle 10 can include turning signal controls and a handbrake lever (not specifically shown), which are both operably coupled to or embedded in the handlebars 20. The turning signal controls can be actuated by applying pressure thereto or squeezing a designated area on the handlebar 20. In some embodiments, the vehicle 10 can include a clutch control (e.g., clutch control lever) for controlling a clutch of a transmission system; however, in other embodiments, the vehicle 10 can be a direct drive system without a transmission system, such that a clutch control is not included.

Still further, the vehicle 10 can include one or more displays 28, which is/are disposed adjacent the handlebars 20 or elsewhere on the vehicle 10. In some embodiments, the display 28 can be touch-sensitive (i.e., the display 28 can be a touch-sensitive input device). As such, the rider 12 can input control commands by physically touching the display 28 to control the various components of the vehicle 10 in a convenient manner. It will be appreciated, however, that the vehicle 10 can include any other input device for inputting control commands. Additionally, the display 28 can provide information about the vehicle visually. For instance, the display 28 can indicate the amount of available charge within the battery in the vehicle 10, the charging state of the battery, the current vehicle mode, wireless interface status, and/or other information. Moreover, the display 28 can indicate to the user that the vehicle 10 is communicating wirelessly with another vehicle 10 or with an external device. Also, in some embodiments, the vehicle 10 can include audio transducers (e.g., speakers) for providing alarms about the state of the vehicle 10 or other audible signals. Moreover, in some embodiments, the vehicle 10 can include tactile transducers (e.g., vibrating surfaces) for providing information about the vehicle 10 in a tactile fashion.

It will be appreciated that the vehicle 10 can be relatively compact and lightweight. For instance, in some embodiments, the total length of the vehicle 10 can be between approximately 20 inches to 100 inches (e.g., 40 inches or approximately one (1) meter). Also, the wheel base length can be between approximately 10 to 75 inches. Additionally, the wheel base length can be between 26 inches and 36 inches. Furthermore, the height (i.e., wheel base to handlebars 20) can be between approximately 10 to 100 inches (e.g., 37 inches). Moreover, the width of the outer body panel(s) 16 can be between approximately 4 inches to 60 inches (e.g., 8.5 inches), and the width of the handlebars 20 (end-to-end) can be approximately 22 inches.

Furthermore, the vehicle 10 can be compact enough and light enough for shipping using standard means. For example, the vehicle 10 can be shipped in one complete unit or in separate parts, with each part weighing less than the limit for standard freight shipping (e.g., 100 pounds). The vehicle 10 may not need liquid fuels or lubricants to further facilitate shipping and storage. In addition, the vehicle 10 can be configured for sale and distribution on the internet or other computerized electronic network. Also, the vehicle 10 can include designated hand grips (separate from the handlebars 20) for lifting and moving the vehicle 10 when the vehicle 10 is not powered. Thus, the vehicle 10 can be very portable.

Referring to FIG. 10, exemplary embodiments of the control assembly 29 will now be discussed. As stated above, the control assembly 29 can include a controller 30, a processor 32, a memory module 34, as well as other computerized components suitable for controlling the various systems of the vehicle 10. In addition, the control assembly 29 can include a gyroscope, an accelerometer, a GPS transceiver, or other similar component for detecting the orientation and position of the vehicle 10 in space, and this data can be processed by the processor 32 for controlling the vehicle 10. This data can also be stored in the memory module 34 for subsequent usage.

Additionally, as shown in FIG. 10, the control assembly 29 can include a communication system 33 for communicating information with a server 60 and/or other vehicles 62*a*, 62*b*, 62*n* within a computerized network. In some embodiments, the control assembly 29 can download programs, maps, or other information from the server 60, can upload past or present operating conditions of the vehicle 10 to the server 60, and/or can transmit any other suitable information to the server 60 and/or the vehicles 62*a*, 62*b*, 62*n* within the network. The communication system 33 can include a wireless transceiver (e.g., Bluetooth and/or digital signal transmitting and decoding devices) and/or can include one or more connectors for attaching wires for establishing communications.

As mentioned above, the controller 30, the processor 32, the memory module 34, the communications system 33 and other components of the control assembly 29 can be self-contained within the controller housing 36. The controller housing 36 can be made out of a strong, rigid material that is similar to the material of the outer body panel(s) 16. Also, in some embodiments, the display 28 can be provided and exposed through the controller housing 36.

As mentioned above, the controller housing 36 can house the controller 30, the processor 32, the memory module 34, the communication system 33, the display 28, and other components of the control assembly 29, independent of the main body 14, the wheel assemblies 18a, 18b, the lighting system 17, motors, etc. Also, the control assembly 29 can be removably attached to the main body 14 of the vehicle 10. For instance, the outer body panel(s) 16 can define an opening 37 into which the control assembly 29 can be removably received. The controller housing 36 can remain exposed when attached to the main body 14 such that the controller housing 36 partially defines an outermost, exterior surface of the vehicle 10. In other embodiments, the outer body panel(s) 16 can include a covered compartment in which the control assembly 29 is received and housed.

The vehicle 10 can also include a latch assembly that removably secures the control assembly 29 to the main body 14. The latch assembly allows the control assembly 29 to be removed from the main body 14 by hand without the need for special tools.

When the control assembly 29 is attached to the main body 14, the control assembly 29 can be in communication with the battery assembly 26, the lighting system 17, motor(s) 50 that drive the wheel assemblies 18a, 18b, and other components of the vehicle 10. For instance, the vehicle 10 can include one or more electrical couplings that establishes electrical communication between the control assembly 29 and these components. Specifically, the electrical coupling can include a male connector mounted to the control assembly 29 and a female connector mounted on the main body 14, or vice versa. The male and female connectors can removably and electrically connected together when the control assembly 29 is attached to the main body 14. As such, control signals, feedback signals, etc. can be transmitted between the control assembly 29 and the electrical components of the main body 14 when the control assembly 29 is attached to the main body 14.

The control assembly 29 can also include connectors (e.g., USB ports, firewire, HDMI, RGB, etc.) for establishing electrical communication with external devices, and these connectors can be used for uploading information, downloading information, connecting with a cellular telephone, etc. The controller 30 can also be equipped with its own software (e.g., integrated communication engine) for upgrading or adding user features, diagnostics, and/or interfacing with other electrical devices such as portable electronic devices, cell phones, etc. via standard computer interfaces such as a USB port. Additionally, the control assembly 29 can have an energy storage device, such as a battery, that is used to power the control assembly 29 (e.g., to power the display 28) when the control assembly 29 is separated from the main body 14 of the vehicle 10. Also, in some embodiments, the control assembly 29 can include a respective power cord or power connector for connecting to a standard power outlet for powering or recharging the control assembly 29 when separated from the main body 14. The battery within the control assembly 29 can also be powered by the solar cell 58.

The stand-alone weight of the control assembly 29 can be relatively low so that the control assembly 29 can be carried easily by hand. Also, the control assembly 29 can include a handle, strap, or other similar feature to make the control assembly 29 even more portable. The control assembly 29 can be light enough to carry by hand and can be compact enough to transport by hand and/or within a bag or other container.

Thus, the rider 12 can transport the control assembly 29 away from the rest of the vehicle 10 when desired. Accordingly, the rider 12 can be park the vehicle 10 in a public space and take the control assembly 29 away from the parked vehicle 10, thereby rendering the vehicle 10 undrivable and also taking some of the most expensive components away from the vehicle 10.

Also, in some embodiments, the control assembly 29 can be a modular component that can be interchangeable with other control assemblies 29. Thus, a newer control assembly 29 with updated software or other additional features can be used to replace an older control assembly 29. Accordingly, the vehicle 10 can be upgraded and repaired very easily. Moreover, in some embodiments, the control assembly 29 can be electronically restored easily to its factory settings (e.g., similar to a personal computer), which can thereby restore the electronics of the entire vehicle 10 back to its operational state.

Figure 8:
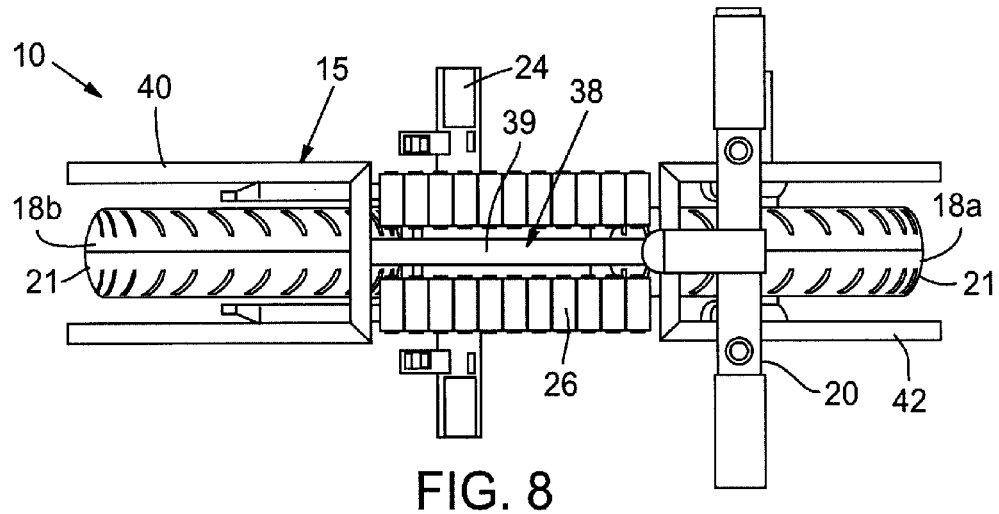
FIG. 8 is a top view of the vehicle of FIG. 1 with the outer body panel assembly removed.
Figure 9:
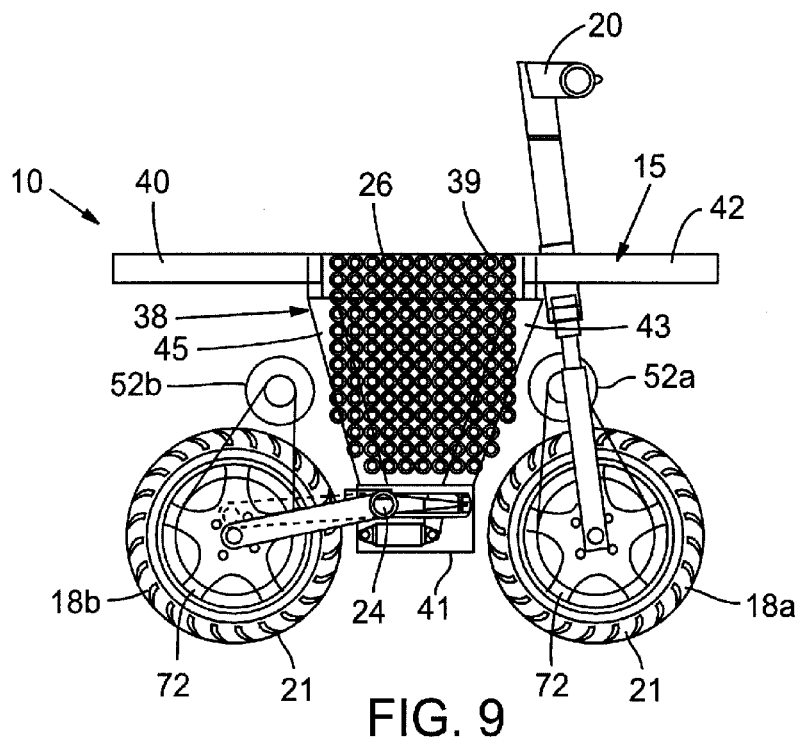
FIG. 9 is a side view of the vehicle of FIG. 1 with the outer body panel assembly removed.

Referring now to FIGS. 6-9 and 18, the frame assembly 15 will be described in greater detail. The frame assembly 15 can include a plurality of interconnected, elongate, and hollow rigid members. The frame assembly 15 can be substantially be made out of aluminum, steel, or any other suitable material. Also, the elements of the frame assembly 15 can be attached in any suitable fashion, such as by welding, fasteners, and the like. As shown in FIG. 9, the frame assembly 15 can include a center frame 38 with a central beam 39, a lower beam 41, a forward beam 43, and a rear beam 45. The forward and rear beams 43, 45 can be fixed together and can extend between the upper and lower beams 39, 41. Also, as shown in FIG. 8, the frame assembly 15 can include a rear upper frame member 40 and a forward upper frame member 42. The upper frame members 40, 42 can each be generally U-shaped and can extend from opposite ends of the center beam 39. Accordingly, the frame assembly 15 can be relatively lightweight and yet sufficiently robust. Also, the frame assembly 15 can be relatively easy to manufacture. For instance, the frame assembly 15 can be water jetted and/or laser cut and then welded together or manufactured in other ways. The components of the frame assembly 15 can also include various notches or slots into which other components fit into, such that the components can be pieced together and then fixedly attached (e.g., by welding or separate fasteners). Also, the frame assembly 15 can be mass produced on an assembly line, etc.

Referring now to FIGS. 1-5 and 18, the outer body panel(s) 16 will be described in greater detail. As shown, the outer body panel(s) 16 can include a front panel 46, a rear panel 48, and a side panel 44. The front rear panels 46, 48 can be substantially flat and plate-like, and the side panel 44 can extend substantially continuously about the vehicle 10 and between the front and rear panels 46, 48. It will be appreciated, however, that the panels 44, 46, 48 can have any shape. For instance, the panels 44, 46, 48 can be arced or bowed and can include creases in designated areas. The side panel can be made from a monolithic, bent plate of metal or other rigid material. Specifically, as shown in FIG. 18, opposite edges of the side panel 44 can be disposed along the bottom of the vehicle 10 and the side panel 44 can be bent so as to continuously extend along the opposite sides and the top of the vehicle 10. The side panel 44 can also envelop the frame assembly 15. The side panel 44 can also extend lengthwise continuously between the front and rear panels 46, 48. Also, the side, front, and rear panels 44, 46, 48 can include a plurality of openings for mounting lights, for providing clearance for the handlebars 20 and foot pegs 24, and for defining openings or wheel wells for the wheel assemblies 18a, 18b. As shown in FIG. 18, the body panels 16 can also include one or more base panels 47 that extend transversely between sides of the side panel 44 to define wheel wells for the wheel assemblies 18a, 18b. The body panels 16 can further include one or more central base plates 49 that extend transversely between sides of the side panel 44 and that are disposed between the base panels 47, toward the bottom of the vehicle 10.

In some embodiments, the body panel(s) 16 can be made out of a lightweight material, such as steel, aluminum and/or rigid plastic material and can be highly recyclable and/or made from recycled materials, including but not limited to composites, fabrics and organics such as wood. It will be appreciated that the body panel(s) 16 can be relatively lightweight and can also include openings for promoting airflow within and through the vehicle 10 for cooling the battery assembly 26, the control assembly 29, and other components of the vehicle 10.

Also, the seat 22 can be positioned over a respective opening in the side panel 44. The seat 22 can include a padded foam bun. As shown in FIG. 18, the seat 22 can be moveably (e.g., pivotally) attached to the rear panel 48. The seat 22 may also be located externally from the main body 14, atop the main body 14, or offset and lifted from the main body 14. The front panel 46 can also be moveably (e.g., pivotally) attached. Cargo spaces can be defined beneath the seat 22 and/or inside the front panel 46. The cargo space(s) can be used for storing the rider's belongings and/or for storing extra battery assemblies 26. The battery assemblies 26 can also be disposed between the side panel 44 and the central beam 39.

Thus, the outer body panel(s) 16 can be of a substantially rectangular, box-shaped, and partially arced construction, wherein the outer body panel(s) 16 can provide structure and support as well as aesthetic appeal. In addition, because of the substantially monolithic (i.e., uni-body) construction of the outer body panel(s) 16, the outer body panel(s) 16 can provide added security for storage of items therein, including items within the cargo space(s), etc. The monolithic construction of the outer body panel(s) 16 can also greatly simplify assembly and manufacture of the vehicle 10. The outer body panel(s) 16 can also be relatively light weight, and yet the outer body panel(s) 16 can have high strength. The outer body panel(s) 16 can embody a full exoskeleton-type support or can cooperate with the frame assembly 15 to provide structural support of the vehicle 10. Furthermore, the outer body panel(s) 16 can be highly aerodynamic (i.e., low drag coefficient) to increase energy efficiency. Also, in some embodiments, the outer body panel(s) 16 can resemble a suitcase, which can reduce frontal area and produce minimal drag during travel.

Referring now to FIGS. 2, 5, 6, 11, and 12, the wheel assemblies 18a, 18b will now be discussed in greater detail. As shown, the wheel assemblies 18a, 18b can each include a tire 21, a rim 72, a hub motor 50 (FIGS. 11 and 12), and an axle 84. In some embodiments, the axle 84 can be less than eight inches long. The rim 72 can be encircled by the tire 21, and the hub motor 50 can be housed within the rim 72. As will be discussed, the hub motor 50 can drivingly rotate the respective wheel assembly 18a, 18b about its axis of rotation.

As shown in FIG. 18, the axle 84 of the front wheel assembly 18a can be coupled to a fork assembly 56. The fork assembly 56 can be removably coupled to the handlebars 20 on one end and can include struts, shocks, or other biased suspension members on the opposite, forked end. Also, the axle 84 of the rear wheel assembly 18b can be coupled to one or more (e.g., two) elongate suspension arms 57. The suspension arms 57 can be rotatably coupled to the lower end of the rear beam 45 of the frame assembly 15 to rotate about an axis of rotation A. One or more biasing members (e.g., torsion springs) can bias the suspension arms 57 in a rotational direction about the axis A such that the rear wheel assembly 18b is biased outward from the main body 14 of the vehicle 10. This biasing can also provide cushioning during riding. The foot pegs 24 can be removably attached to the respective suspension arm 57 so as to be aligned with the axis of rotation A.

When the rider 12 is seated on the vehicle, the axle 84 of the rear wheel assembly 18b (and thus, the axis of rotation of the rear wheel assembly 18b) can have a neutral position, and the axle 84 can rotate about the axis of rotation A. In this neutral position, the axle 84 can be disposed vertically above the axis of rotation A (e.g., due to combined weight of the vehicle 10 and the weight of the rider 12). In other words, in a linear direction that is normal to the riding surface, the axis of rotation A can be disposed between the riding surface and the axle 84. This configuration can provide added stability for the vehicle 10, especially considering the relatively short wheelbase length of the vehicle 10. Also, this configuration can help inhibit wheelies (i.e., the front wheel assembly 18a leaving the riding surface). Moreover, the suspension system of the vehicle 10 can be remain compact for added storage, etc.

Figure 11:
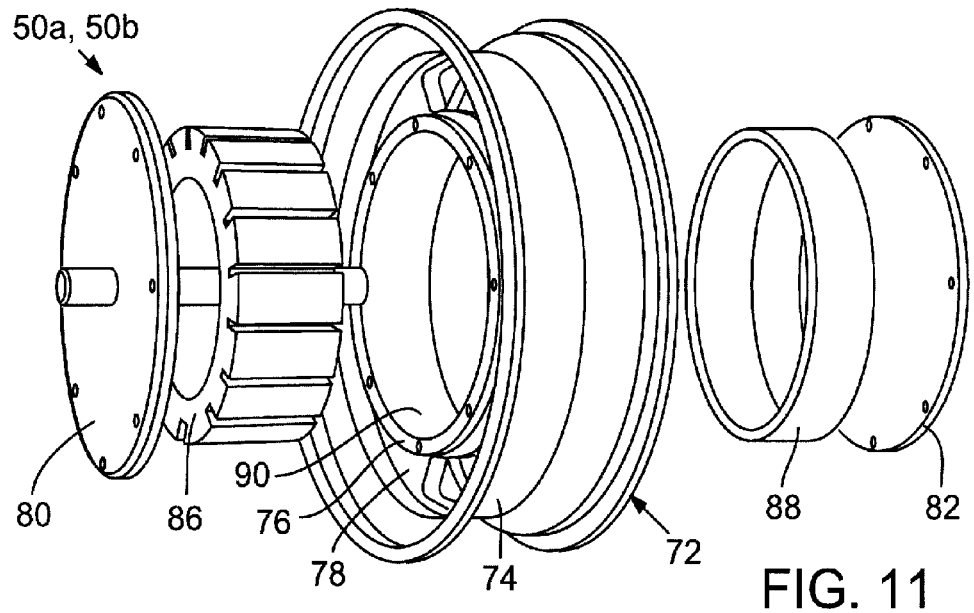
FIG. 11 is an exploded view of a wheel assembly of the vehicle of FIG. 1.
Figure 12:
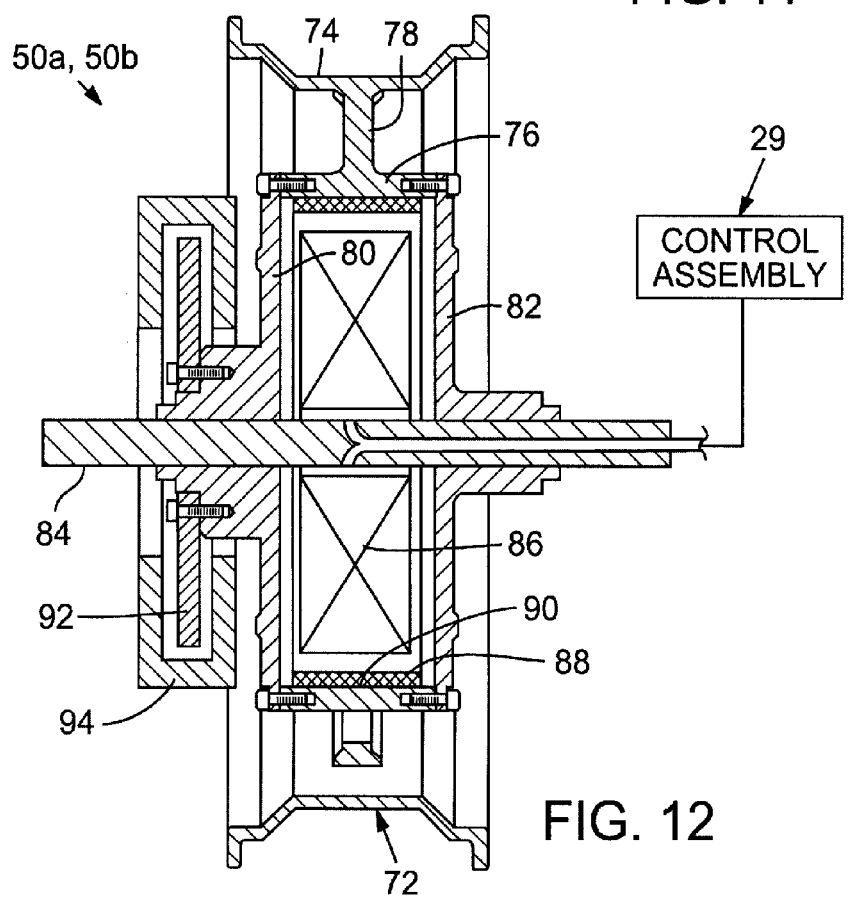
FIG. 12 is a cross sectional view of the wheel assembly of FIG. 11.

One or both of the wheel assemblies 18a, 18b can include the features shown in detail in FIGS. 11 and 12. As shown, the rim 72 can include an outer ring portion 74, an inner ring portion 76, and a plurality of spoke portions 78 that extend radially between the inner and outer ring portions 74, 76. The ring portions 76, 78 and spoke portions 78 can be integrally connected so as to be monolithic. Also, the ring portions 76, 78 and spoke portions 78 can be molded or formed on a mill and/or lathe out of Aluminum, Aluminum alloy, or any other suitable material. As such, these portions of the rim 72 can be monolithic and weld-free such that the rim 72 is relatively lightweight. However, in other embodiments, these portions of the rim 72 can be welded or otherwise fastened together.

The rim 72 can also include a first end cap 80 and a second end cap 82. The end caps 80, 82 can be substantially flat and disc-shaped and can be made out of Aluminum, Aluminum alloy, or any other suitable material. As shown in FIG. 12, the end caps 80, 82 can be fixed to opposite sides of the inner ring portion 76 (e.g., by fasteners, etc.) to thereby cover the respective openings in the inner ring portion 76 and further enclose the motor 50 within the rim 72. In other embodiments, only one of the end caps 80, 82 is removably coupled to the inner ring portion 76 (e.g., by fasteners) while the other end cap 80, 82 is integrally coupled to the inner ring portion 76 so as to be monolithic. The end caps 80, 82 can also be rotatably coupled to the respective axle 84, for instance, by a known bearing (not shown). Additionally, the rim 72 can be highly heat conductive to thereby transfer heat generated by the motor 50 away from the wheel assembly 18a, 18b.

The hub motor 50 can be of any suitable type, such as an electric motor (e.g., a brushless DC motor) having a stator 86 and a rotor 88 (both schematically shown in FIGS. 11 and 12). The stator 86 can include a plurality of electromagnets that are electrically connected to the control assembly 29 (FIG. 12), and the stator 86 can be fixed to the axle 84. The rotor 88 can include a plurality of permanent magnets that is fixed directly to an interior surface 90 of the inner ring portion 76. In other embodiments, the rotor 88 is integrally connected to the interior surface 90 so as to be monolithic. For instance, in the latter embodiment, the inner ring portion 76 can be made at least partially from a magnetic material such that the inner ring portion 76 itself functions as the rotor 88 of the motor 50.

The motor(s) 50 can also include any number of sensors to detect various conditions of the motor 50. For instance, the motor(s) 50 can include position sensors, such as HAL position sensor(s) in some embodiments.

When the stator 86 is energized, the stator 86 can drive the rotor 88 (and thus the rim 72 and tire 21) in rotation about the axle 84. It will be appreciated that the rim 72 can function both as a structural member of the wheel assembly 18a, 18b as well as a housing for the motor 50 because the stator and rotor 86, 88 can be encased only by the inner ring portion 76 and the end caps 80, 82. In other words, the stator 86 and rotor 88 can be directly exposed to the rim 72, and the motor 50 need not include a separate housing. As such, the wheel assembly 18a, 18b can be relatively low in weight. For example, each wheel assembly 18a, 18b can weigh between approximately eight and fifteen pounds apiece. It will be appreciated, however, that the motors 50 could include a housing that is separate and distinct from the rim 72. It will also be appreciated that the rim 72 can include a sealant that substantially seals any gaps and inhibits unwanted debris from intruding into the motor 50.

Also, in some embodiments, the motors 50 can be easily replaceable and interchangeable with alternate motors 50. For instance, the wheel assemblies 18a, 18b can be disassembled (e.g., the end cap(s) 80, 82 can be removed from the inner ring portion 76), and the motor 50 can be removed and replaced with alternate components. Accordingly, the wheel assemblies 18a, 18b can also be modular and adaptable, for instance, to upgrade the motors 50 of the vehicle 10 with higher power motors 50.

The hub motors 50 can have any suitable output, such as one (1) to one hundred (100) horsepower. For instance, in some embodiments, the hub motors 50 can each be a four horsepower motor. Accordingly, the vehicle 10 can have any suitable maximum speed (e.g., approximately forty mph), and this maximum speed may or may not be electronically limited by the controller 30 to comply with traffic laws or any other appropriate rule or regulation. Also, the vehicle 10 can accelerate from zero to forty mph in four to six seconds in some embodiments. Furthermore, in some embodiments, the vehicle 10 can accelerate to average speed in less than twelve seconds. The motors 50 can perform as direct drive motors 50 (i.e., without a transmission system) and directly drive the rim 72 and tire 21 for added weight savings. Accordingly, the wheel assemblies 18a, 18b can be powerful and yet relatively light (e.g., approximately ten to twenty pounds each). The wheel assemblies 18a, 18b can also be relatively compact.

Referring now to FIG. 9, additional embodiments of motors 52a, 52b for the vehicle 10 are illustrated. As shown, the vehicle 10 can include respective front and rear belt drive motors 52a, 52b that are disposed outside the respective wheel assemblies 18a, 18b. The belt drive motors 52a, 52b can be electric motors or other suitable motors that are operably connected to respective ones of the front and rear wheels 18a, 18b by a respective belt.

Figure 13:
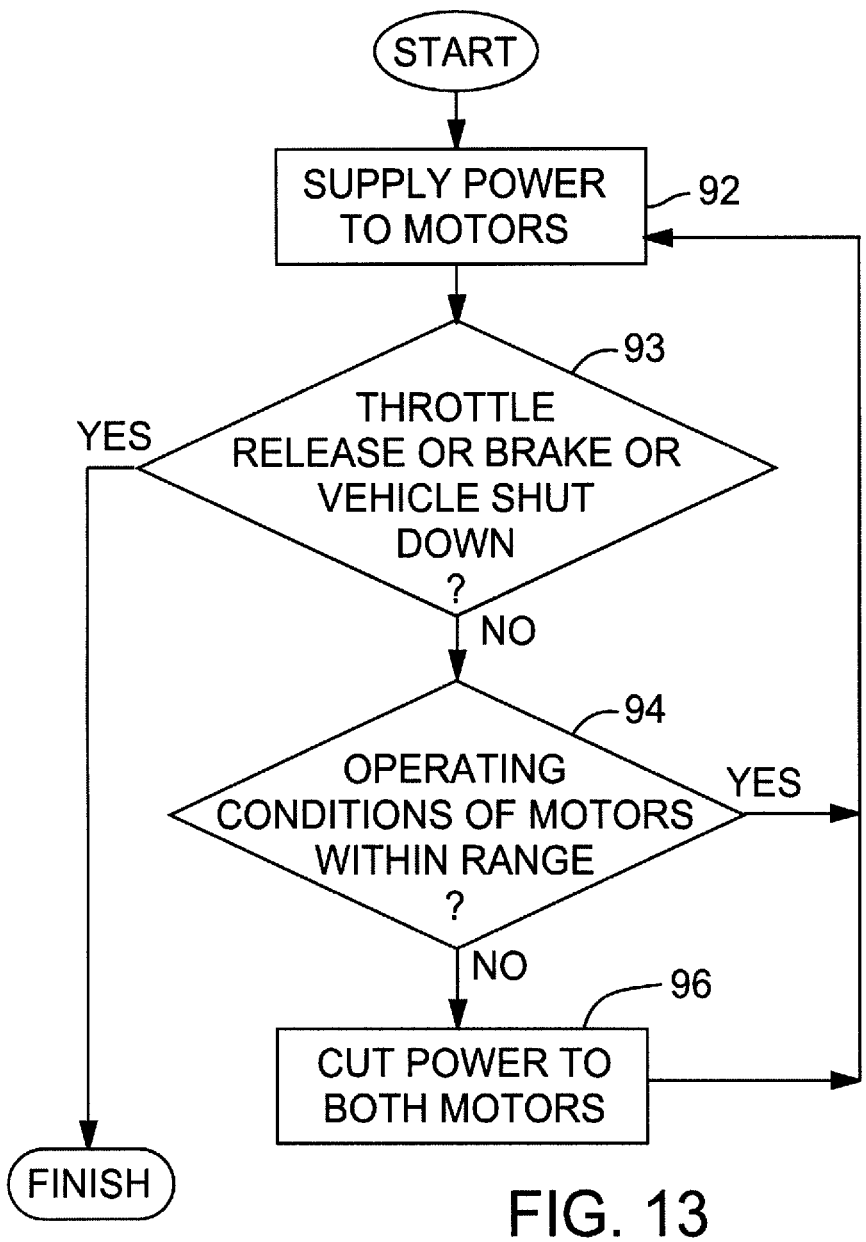
FIG. 13 is a flowchart of a method of controlling the vehicle of FIG. 1.

Referring now to FIG. 13, the control assembly 29 and a method of controlling the motors 50 will be discussed in greater detail. This method can be equally applied to the motors 52a, 52b discussed above in relation to FIG. 9 as well.

As mentioned above, the control assembly 29 can independently control the motors 50 such that the motors 50 drive rotation of the first and second wheel assemblies 18a, 18b independent of each other. Thus, the control assembly 29 can provide all-wheel drive for the vehicle 10. This can provide added stability for the vehicle 10, especially considering the relatively short wheel base of the vehicle 10. It will also be appreciated that the all-wheel drive system can allow for increased power output with less energy draw, thereby making the vehicle 10 more energy efficient. Furthermore, power output can be varied between the motors 50 to thereby increase efficiency.

Assuming that the vehicle 10 is powered ON and the rider 12 has turned the throttle, the controller 30 can cause a corresponding amount of current, voltage, power, etc. to be supplied from the battery assembly 26 to both motors 50 (block 92 in FIG. 13). In some embodiments, substantially equal amounts of current, voltage, power, etc. (substantially equal electrical input) can be delivered to the motors 50.

Then, in decision block 93, it is determined whether the throttle has been released, whether the brake lever has been actuated to decelerate the vehicle, or whether the vehicle 10 has been powered down. If so (block 93 answered affirmatively), then the method is completed. However, if not (block 93 answered negatively), then the method continues in block 94.

In decision block 94, the controller 30 compares an operating condition of the motors 50 of the first and second wheel assemblies 18a, 18b. Specifically, the controller 30 can monitor and detect the current level, voltage, power level, angular velocity, speed, or any other operating condition or any output of the motors 50. Furthermore, the controller 30 can determine whether these compared operating conditions are within a predetermined range of each other. In some embodiments, the predetermined range can be between 90% and 100%, and in some additional embodiments, the predetermined range can be between 95% and 100%. The controller 30 can maintain the motors 50 within this range, for instance, by employing comparative motor synchronization control methods.

If the operating conditions are outside the predetermined range (i.e., block 94 answered negatively), then in block 96, the controller 30 can reduce power, voltage, current, etc. to one or both motors 50. Specifically, in some embodiments of block 96, the controller 30 substantially simultaneously cuts power to both motors 50. Power can be cut for a predetermined amount of time (e.g., a fraction of a second) before block 92 is repeated and power is restored to the motors 50. The method is looped as such until the throttle is released, the brakes are applied, or the vehicle is shut down (block 93 answered affirmatively).

Operating as such, the controller 30 can provide traction control (i.e., can reduce slippage of the wheel assemblies 18a, 18b). For instance, if the rear wheel 18b begins to slip due to loss of traction on a slippery riding surface, the current level, angular velocity, speed, or other operating condition of the rear wheel assembly 18b can spike as compared to the current level of the front wheel assembly 18a. The controller 30 can detect this substantial difference in current level of the wheel assemblies 18a, 18b, and the controller 30 can cut power to both motors 50 of the wheel assemblies 18a, 18b for a fraction of a second before re-supplying power to both. The controller 30 can repeat this process until the rear wheel assembly 18b regains traction and the respective operating conditions of the rear wheel assembly 18b return to within the range of the operating conditions of the front wheel assembly 18a.

Furthermore, these methods can maintain both wheel assemblies 18a, 18b in contact with the road or other riding surface. For instance, if the front wheel assembly 18a begins to lift from the road (i.e., a "wheelie" condition), the current level, angular velocity, etc. of the front wheel assembly 18a is likely to ramp outside the predetermined range of the rear wheel assembly 18b. The controller 30 can cut power to both wheel assemblies 18a, 18b, thereby causing the front wheel assembly 18a to regain contact with the road. The same control method can substantially prevent the rear wheel 18b from lifting from the road (i.e., a "front end-o" condition). It will be appreciated that either wheel assembly 18a, 18b can lift from the riding surface without having to cut power to the motors 50 (e.g., while riding on rougher terrain or off-roading) as long as the operation of the motors 50 stays within the predetermined range discussed above.

While riding through a turn, the wheel assemblies 18a, 18b will likely rotate at different angular velocities. The difference in angular velocity will depend on the radius of the turn. As stated, the controller 30 can maintain operation of the motors 50 within the predetermined range. This range can be sufficiently wide to allow the wheel assemblies 18a, 18b to spin at different velocities to complete most turns. Also, if the vehicle 10 is travelling through a very tight turn, the controller 30 can temporarily cut power to one or both motors 50 to allow the resultant difference in angular velocities of the motors 50, thereby allowing the vehicle 10 to complete the turn.

Still further, because of these control methods, operations of the motors 50 can be automatically adapted for a wide variety of riders 12 having different weights, heights, riding positions on the vehicle 10, grade, etc. More specifically, the vehicle 10 carrying a lighter weight rider 12 that rides primarily upright will have a different center of gravity than the vehicle 10 carrying a heavier rider 12 riding primarily hunched over. Regardless, the controller 30 can provide traction control, etc. in the same manner discussed above and illustrated in FIG. 13. Accordingly, the controller 30 can automatically determine appropriate vehicle accelerations and/or decelerations for the current riding surface, grade, rider weight, rider position, and/or vehicle loading. Thus the vehicle 10 can self-adapt for safe and stable riding, further enhancing stability.

Moreover, the controller 30 can maintain acceleration and/or deceleration of the wheel assemblies 18a, 18b to within predetermined limits to improve ride quality. This can occur across all modes of steady state motor rotation and vehicle motion at coast and steady-state applied power.

Moreover, the motors 50 can be used for braking (decelerating) the vehicle. Specifically, one or more hand-brake control levers can be mounted to the handlebars 20, and upon actuating these levers, corresponding reverse voltage can be supplied to one or both motors 50 (i.e., polarity can be reversed, current injection, etc.) to thereby decelerate the vehicle 10. The system can decelerate both wheels 18a, 18b independently or equally. Electricity can also be generated in this fashion for recharging the battery assembly 26. In some embodiments, the braking can be selectively controlled by the user (e.g., by inducing the electronic braking system to a percentage for coasting). In some embodiments, the vehicle 10 can include a switch that changes the mode of the motor(s) 50 between an electricity generating mode and a driving mode (i.e., the switch can change the polarity supplied to the motor(s) when changing between these modes).

The controller 30 can also operate to detect various riding conditions of the vehicle 10 that are suitable for switching the motor 50 to the electricity generating mode and back to the driving mode. For instance, the controller 30 can detect that the rider 12 has actuated the brake lever, that the vehicle 10 is coasting, and/or that the vehicle is traveling downhill, each of which might cause the controller 30 to automatically switch the motor 50 to generate electricity.

Also, in some embodiments, the controller 30 can cause one motor 50 to generate electricity while the other motor 50 drivingly rotates its respective wheel assembly 18a, 18b. In other words, the motors 50 can be operating in the electricity generating mode and driving mode simultaneously. Thus, at any given time, one motor 50 may switch to electricity generating mode while the vehicle 10 is being propelled by the other motor 50. This switching can occur on either the front motor 50 or the rear motor 50 at any suitable time. In this situation, the polarities supplied to the motors 50 would be opposite each other. As stated, the controller 30 can operate to detect various riding conditions that are suitable for placing the motors 50 simultaneously in these opposite modes. For instance, this can occur during deceleration, acceleration, or constant velocity travel of the vehicle 10.

Furthermore, control methods similar to those discussed above can be applied for resisting locking of the wheel assemblies 18a, 18b (i.e., to operate as an anti-lock braking system). For instance, when the reverse voltage is applied to decelerate the motors 50, the controller 30 can compare the operating conditions of the motors 50. Should the operating conditions of one motor 50 fall outside the predetermined range of the other due to a locking condition of one motor 50, then the power can be cut to both for a fraction of a second to unlock the motor 50.

It will be appreciated that this electronic braking system can be an alternative to or in addition to another braking system, such as a hydraulic braking system, mechanical braking system, etc. For instance, as shown in FIG. 12, the vehicle 10 can include a disc brake 92 and calipers 94, which are each operably coupled to the wheel 18a, 18b in a known fashion. The disc brake 92 and calipers 94 can be disposed on either side of the rim 72, adjacent either end cap 80, 82. For instance, in embodiments in which only one end cap 80, 82 is removably coupled to the inner ring portion 76 and the other end cap 80, 82 is integrally connected to the ring portion 76, the disc brake 92 and calipers 94 can be disposed on the side adjacent the removable end cap 80, 82.

The calipers 94 can selectively grip the disc brake 92 when the rider 12 actuates the brake lever (e.g., due to flow of brake fluid, actuation of a cable linkage, etc.) to thereby decelerate the wheel 18a, 18b. Thus, it will be appreciated that the disc brake 92 and calipers 94 can be used in addition to or instead of the electronic braking system discussed above. Moreover, the braking system can brake only one of the wheels 18a, 18b in some embodiments. Also, in some embodiments, only one of the wheels 18a, 18b is equipped for electronic braking while the other wheel 18a, 18b is equipped for hydraulic or mechanical braking. It will be appreciated that the calipers 94 can be actuated without the use of braking fluid and, instead, rely on actuation of mechanical linkages such that the vehicle 10 does not include any on-board brake fluids.

Figure 6:
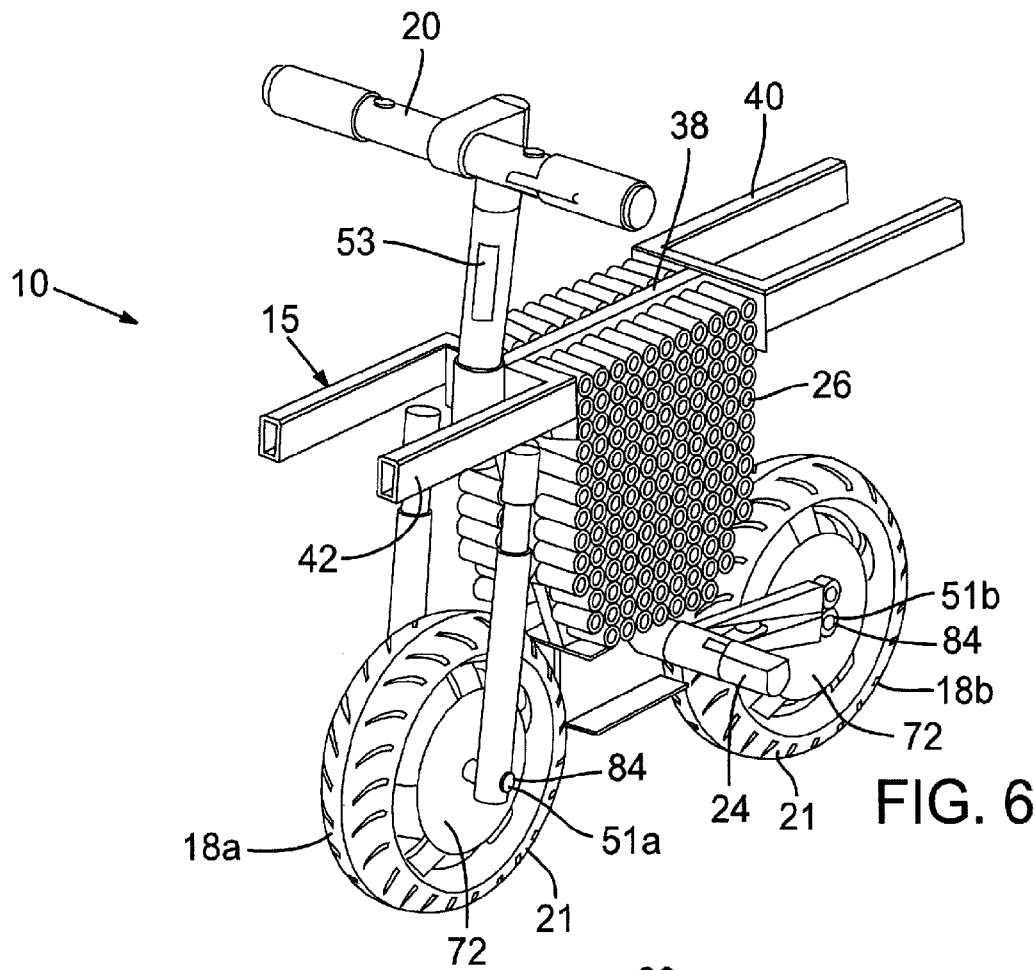
FIG. 6 is a perspective view of the vehicle of FIG. 1 with the outer body panel assembly removed.
Figure 7:
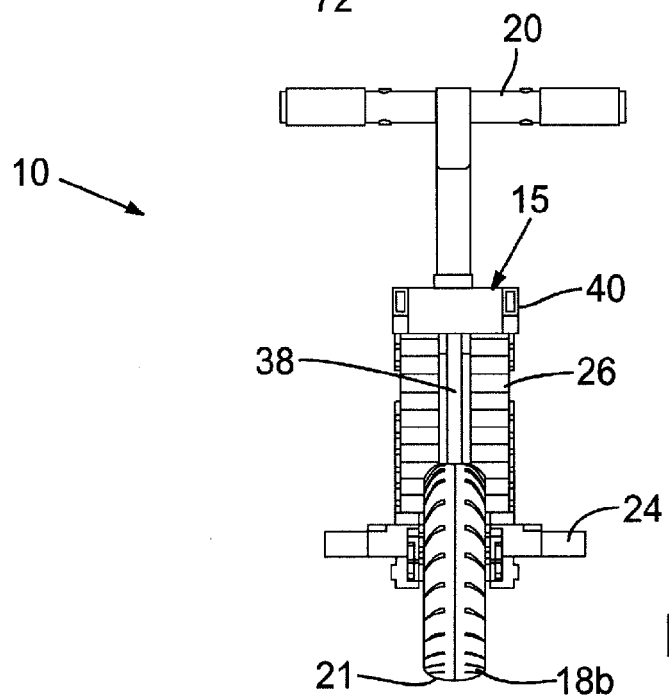
FIG. 7 is a rear view of the vehicle of FIG. 1 with the outer body panel assembly removed.

Referring now to FIG. 10, additional embodiments of an all-wheel drive system for the vehicle 10 are illustrated. As shown, the vehicle 10 can include a front wheel sensor 51a, a rear wheel sensor 51b, and a steering angle sensor 53 (FIGS. 6 and 10). These sensors 51a, 51b, 53 can be in communication with the controller 30 (FIG. 10). The sensors 51a, 51b can be of any suitable type, such as a speed sensor, accelerometer, etc. The sensors 51a, 51b can detect one or more various characteristics of the respective wheels 18a, 18b, and the sensors 51a, 51b can transmit correlated signals to the controller 30. Also, the steering angle sensor 53 can determine the turning angle of the front wheel 18a and can transmits correlated signals to the controller 30. The controller 30 can determine how to control the motors 50 of the wheels 18a, 18b based on the input from the sensors 51a, 51b, 53.

For instance, if the steering angle sensor 53 determines that the front wheel 18a is being turned past a threshold turning angle, the controller 30 can transmit control signals to cause each wheel 18a, 18b to be driven at different speeds and to allow the wheels 18a, 18b to travel different distances through the turn. In some embodiments, the controller 30 can refer to a look-up table in the memory module 34 to determine a desired speed differential or ratio of the front and rear wheels 18a, 18b according to the detected turning angle, and the controller 30 can control the speed of the wheels 18a, 18b according to the look-up table. Also, the wheel sensors 51a, 51b can provide the necessary feedback signals to the controller 30 to confirm that the wheels 18a, 18b are rotating at the desired speed ratio.

Furthermore, the controller 30 can rely on the wheel sensors 51a, 51b and voltage differentiation or current regulation (or angular velocity, etc.) to maintain traction control. For instance, if one or both of the wheel sensors 51a, 51b detects that the respective wheel 18a, 18b is slipping, the processor 32 can control the corresponding motor 50 at the wheel 18a, 18b to reduce torque and thereby reduce slippage. Accordingly, the stability of the vehicle 10 can be enhanced or maintained.

Likewise, the controller 30 can similarly rely on the wheel sensors 51a, 51b to detect whether one or more wheels has an excessive amount of torque or speed. For instance, if the rear wheel 18b has excessive amount of torque, the controller 30 can control the rear motor 50b of the rear wheel 18b to reduce torque and substantially reduce the likelihood of the front wheel 18a lifting off the riding surface. Thus, the controller 30 can operate as an electronic anti-wheelie control. Likewise, the controller 30 can operate to reduce the likelihood of the rear wheel 18b lifting off the riding surface. The controller 30 can also automatically adapt to the grade, riding surface, rider position, etc. as discussed above with respect to FIG. 13.

In addition, the controller 30 can control the brakes of the front and rear wheels 18a, 18b independently. For instance, the controller 30 can control the brakes to prevent locking of the respective wheel(s) 18a, 18b.

It will be appreciated that, in some embodiments, the traction control, stability control, and/or antilock braking systems can be realized by monitoring the input and/or output of the motors 50 of each wheel 18a, 18b. For instance, if power output from one motor 50 is outside a predetermined threshold (i.e., indicative of wheel slippage, etc.), then the controller 30 can reduce power to that motor 50 to maintain traction and/or stability of the vehicle. Thus, the all-wheel drive capability of the vehicle 10 can allow for simple, efficient, and relatively inexpensive traction control, stability control, braking control, rider and vehicle calibration, and adaptation for different riding surfaces and grades.

As discussed above, the vehicle 10 can be modular and easily reconfigured according to the desires of the rider 12, according to the driving laws of a particular municipality, or for any other reason. For instance, the vehicle 10 can include interchangeable controller assemblies 29 such that the control systems of the vehicle 10 can be upgraded and otherwise changed in a convenient manner. Moreover, other systems of the vehicle 10 can be interchangeable. For instance, the wheels 18a, 18b can be interchanged, the outer body panel(s) 16 can be easily interchanged or replaced, and other features of the vehicle 10 can be interchanged to change the aesthetics of the vehicle 10, to change the riding quality of the vehicle 10, or for any other appropriate reason.

Figure 19:
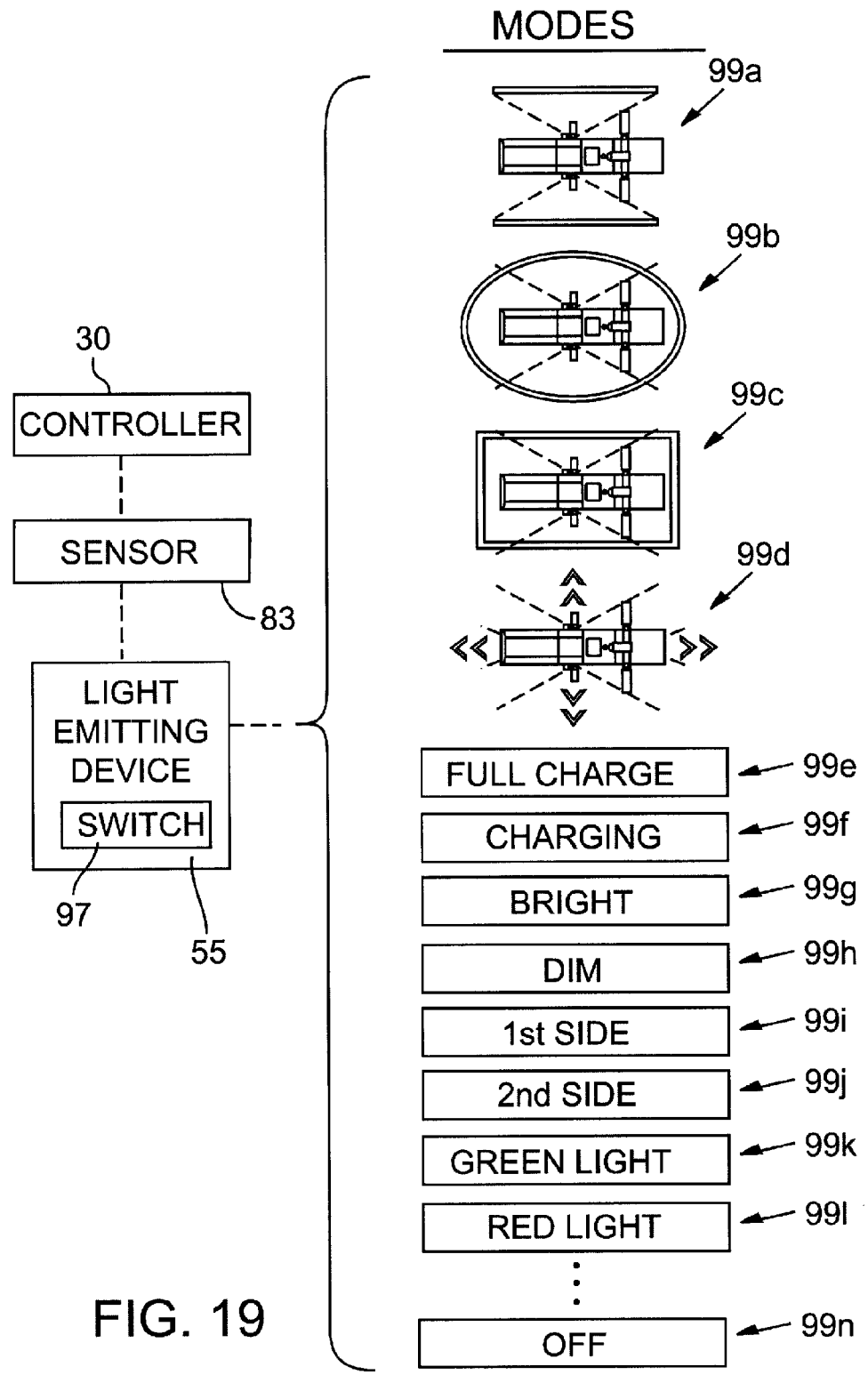
FIG. 19 is a schematic view of a ground lighting system of the vehicle of FIG. 1.

The vehicle 10 can also include a ground lighting system 54 (as shown in FIGS. 1 and 19). In some embodiments, the ground lighting system 54 can include one or more (e.g., a row) of light emitting devices 55 (e.g., LEDs, fiber optics, lasers, etc.). The light emitting devices 55 can be mounted to the main body 14 at any suitable location. For instance, the light emitting devices 55 can be mounted to the side panel 44 on one or both sides of the vehicle 10, adjacent the foot pegs 24, to emit light generally to the side of the vehicle 10. The light emitting devices 55 can also be mounted to the front and/or rear panels 46, 48 to emit light generally forward and rearward of the vehicle, respectively. It will also be appreciated that the light emitting devices 55 can be mounted to directly the rider 12 (e.g., to the rider's helmet).

As will be discussed, the ground lighting system 54 can emit light toward the riding surface (the road, etc.) to create a defined image thereon. The images created can be of any suitable type, such as straight lines, an annular shape, a polygonal shape, a word, a logo, a road sign, and the like. These images can also be programmable by the user. The images can also be animated.

The ground lighting system 54 can be powered by the battery assembly 26. Also, the ground lighting system 54 can be powered by the secondary power source 71 of the control assembly 29.

As shown in FIG. 19, the ground lighting system 54 can also include a controller 30, which controls the light emitting devices 55 as will be discussed. The controller 30 can be independent of the controller 30 of the control assembly 29, or the controller 30 of the control assembly 29 can control the light emitting devices 55 as well as the other components of the vehicle 10 as discussed above.

The ground lighting system 54 can further include one or more sensors 83. The sensor 83 can be of any type, including, but not limited to the sensors discussed above (e.g., accelerometers, speedometers, rider detection sensors, etc.), or the sensor 83 can be of a different type. The sensor 83 can detect conditions of the vehicle 10 (i.e., whether a predetermined condition is occurring).

In some embodiments, the sensor 83 can be a proximity sensor. Specifically, the sensor 83 can be a camera or other visual proximity sensor, an acoustic proximity sensor, or any other type. The sensor 83 can be programmed to detect whether an object (e.g., another vehicle, a pedestrian, etc.) is within a predetermined distance of the vehicle 10 (e.g., within 5 feet of the vehicle 10).

Also, in some embodiments, the sensor 83 is a motion sensor, such as an accelerometer, etc., for detecting motion of the vehicle 10 (i.e., detecting whether the vehicle 10 moves in a predetermined direction). Also, in some embodiments, the sensor 83 is in communication with the manual turn signal controls so that the sensor 83 can detect whether the vehicle 10 is turning left or right. Likewise, the sensor 83 can be a turning angle sensor to detect whether the vehicle is turning left or right.

The sensor 83 can also detect other conditions. For instance, the sensor 83 can detect whether the speed of the vehicle 10 is within a predetermined range, whether the vehicle 10 is stationary or parked, etc.

The light emitting devices 55 can have a plurality of modes 99a-99n as shown in FIG. 19, and the defined images created by the light emitting devices 55 can be different in each mode. The shape, size, brightness, color, or other features of the images created on the riding surface can be different for each mode 99a-99n. The controller 30 can control a switch 97 for changing between the different modes 99a-99n. The controller 30 can also cause switching between the different modes 99a-99n based on the conditions detected by the sensor 83.

In the embodiments illustrated in FIG. 19, modes 99a, 99b, 99c, 99d, 99d are illustrated by top views of the vehicle 10, and the images created in each mode are shown surrounding the vehicle 10. In mode 99a, the light emitting device(s) 55 emit light to create a defined image of two substantially straight lines on opposite sides of the vehicle 10 to demarcate a riding lane for the vehicle 10. In other words, the vehicle 10 can be disposed between the lines/lanes, and the lines/lanes will visually indicate to other drivers not to cross into that lane. Other boundary zones can also be indicated by the light emitting device(s) 55. For instance, in mode 99b, a rounded, annular image can be created about the vehicle 10. In mode 99c, a polygonal (e.g., rectangular) image can be created around the vehicle 10. Other images can extend only partially around the vehicle 10. Moreover, in mode 99d, arrowheads can be formed on all four sides of the vehicle 10. Thus, the different modes 99a-99d can include images of different shapes and sizes. Other modes 99e-99l are represented schematically. For instance, in mode 99g, the image will be brighter than in mode 99h. Also, in mode 99i, the image will be created on one side (e.g., the left side) of the vehicle 10, and the image will be created on the other side (e.g., the right side) of the vehicle 10. Still further, the same image can be created in different colors in modes 99k (green color) and 99l (red color). Still further, the light emitting devices 55 can have an OFF mode in which the light emitting devices 55 do not emit light.

The controller 30 can vary and switch between the modes 99a-99n according to any suitable programming or functioning. For instance, if the sensor 83 detects a surrounding vehicle that is too close to the vehicle 10 (i.e., a surrounding vehicle that is within the predetermined distance of the vehicle), then the controller 30 can cause the vehicle 10 to switch from the mode 99a to mode 99b to act as a warning to the other driver and/or to the rider 12 of the vehicle 10. The color of the image can be changed as well in this situation (i.e., the mode can change from 99k to 99l or vice versa). The mode can change from the OFF mode 99n to mode 99a or to another ON mode to act as a warning. Furthermore, the image can change from being constantly ON to intermittently flashing ON and OFF in another mode change.

Also, when the sensor 83 is an ambient light sensor, and the sensor 83 detects that ambient light levels are below a predetermined level (i.e., detects darkness), the mode can be changed from a bright mode 99g to a dim mode 99h such that the images can be created with less light to thereby conserve energy. On the other hand, if the sensor 83 detects higher ambient light levels, then the mode can be changed from the dim mode 99h to bright mode 99g. Still further, the light emitting devices 55 can be automatically switched from the OFF mode 99n to one of the other modes depending on the change in ambient light levels.

Additionally, the light emitting devices 55 can be used as turn signals or for otherwise signaling the intended direction of travel of the vehicle 10. For instance, if the sensor 83 detects a right turn is intended by the rider 12, then the mode can be switched to mode 99i (first direction mode), for instance, to create an arrowhead only on the right hand side of the vehicle 10. On the other hand, if the sensor 83 detects a left turn is intended by the rider 12, then the mode can be switched to mode 99j (second direction mode), for instance, to create an arrowhead only on the left hand side of the vehicle 10. This switch can occur manually or automatically. Thus, the images created on the riding surface (e.g., street) can indicate to surrounding vehicles, pedestrians, etc., of the intentions of the rider 12. Similarly, if the sensor 83 detects forward movement of the vehicle 10, one or more representative images can be created forward of the vehicle 10 to indicate forward movement. Also, if the sensor 83 detects rearward movement of the vehicle 10, one or more images can be created rearward of the vehicle 10 to indicate rearward movement. Thus, if the sensor 83 is a motion sensor detecting motion of the vehicle 10, then the light emitting devices 55 can be controlled to signal the intended motion of the vehicle 10.

Changing the modes 99a-99n can occur via any suitable means. For instance, to change colors of the images, color filters can be used, different voltages can be supplied to the light emitting devices 55, etc. To change the size and/or location of the images, the light emitting devices 55 can include lenses that are actuated and/or adjusted. Also, different light emitting devices 55 mounted to different areas of the vehicle 10 can be turned OFF and ON to change the location of the images.

Still further, the images from the light emitting devices 55 can be used for indicating that the vehicle 10 has stopped and/or parked. The images can help a person find the vehicle 10 in a crowded parking lot as well. Moreover, the light emitting devices 55 can be in mode 99f when the battery assembly 26 is less than fully charged and/or is being charged; then the mode can change to mode 99e when the battery assembly 26 is fully charged. The light emitting devices 55 can be similarly used to indicate to the rider 12 that the vehicle 10 has been switched from standby to drive modes.

It will thus be appreciated that the ground lighting system 54 can be very useful and can be aesthetically pleasing. It will also be appreciated that the system 54 can be used in ways not explicitly discussed herein.

Also, in some embodiments, the vehicle 10 can include various rider detection features. For instance, the handlebars 20 can include various pressure-sensitive sensors or other types of sensors for detecting that the rider 12 is grasping the handlebars 20. In addition, in some embodiments, the foot pegs 24 can include pressure sensors or other sensors for detecting that the rider 12 has placed his or her feet on the foot pegs 24. Likewise, the seat 22 can include pressure sensors or other types of sensors for detecting that the rider 12 is seated on the vehicle 10. Also, these sensors can act as an automatic shutoff for the vehicle 10 if the rider 12 moves away from the vehicle 10 and/or is inadvertently thrown from the vehicle 10. Also, these sensors can be used to verify that the rider 12 is properly positioned on the vehicle 10. It will also be appreciated that the sensors can be used for programming and governing intended and proper use of the vehicle 10 as needed or required by municipal traffic laws, etc.

Moreover, these sensors can be user-specific. For instance, the vehicle 10 can include a detection system that detects that a specific rider 12 is riding the vehicle 10 to thereby prevent theft of the vehicle 10. In addition, in some embodiments, the rider 12 can be equipped with a key fob or other identifier that electrically and wirelessly communicates with the vehicle 10, and when the rider 12 with the key fob is within a predetermined perimeter of the vehicle 10, the vehicle 10 can be powered and can be driven. Also, in some embodiments, the rider 12 may need to enter a pin or other code that can be entered via the touchscreen display 28 before the vehicle 10 can be powered up and/or driven.

Moreover, the vehicle 10 can include various other features. For instance, the vehicle 10 can be equipped with an integrated or separate bike lock, a folding seat, an external electrical outlet/charging/vehicle-to-vehicle charging jack, a key lock, and a kickstand. Also, the vehicle 10 can include a kill switch (e.g., a hard wired switch) for overriding and cutting power supplied to the vehicle 10.

Referring now to FIGS. 14-17, additional features of the vehicle 10 will be discussed. In general, FIGS. 14-17 illustrate the control assembly 29 and how the control assembly 29 is removably coupled to the main body 14 of the vehicle 10. These features allow the control assembly 29 to be modular, meaning that the control assemblies 29 of two different vehicles could be interchangeable. Also, if one control assembly 29 includes outdated software, etc., the control assembly 29 can be easily replaced with a control assembly 29 that is newer to thereby upgrade the vehicle 10. Still further, the vehicle 10 can be driven to a location, the user can remove the control assembly 29 from the main body 14, and leave only the main body 14 parked; thus, the more valuable components within the control assembly 29 can remain in possession of the user when the vehicle 10 is parked in public.

Figure 14:
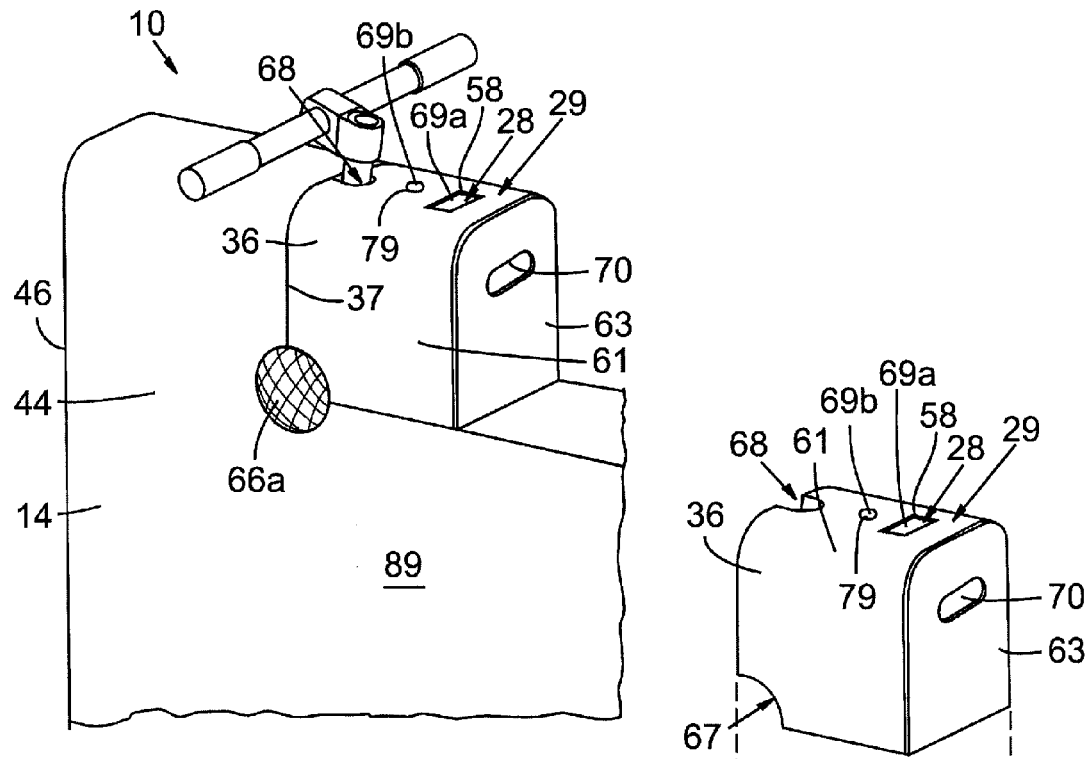
FIG. 14 is an isometric, rear view of the vehicle according to additional embodiments with a removable controller assembly shown attached to the main body of the vehicle.
Figure 15:
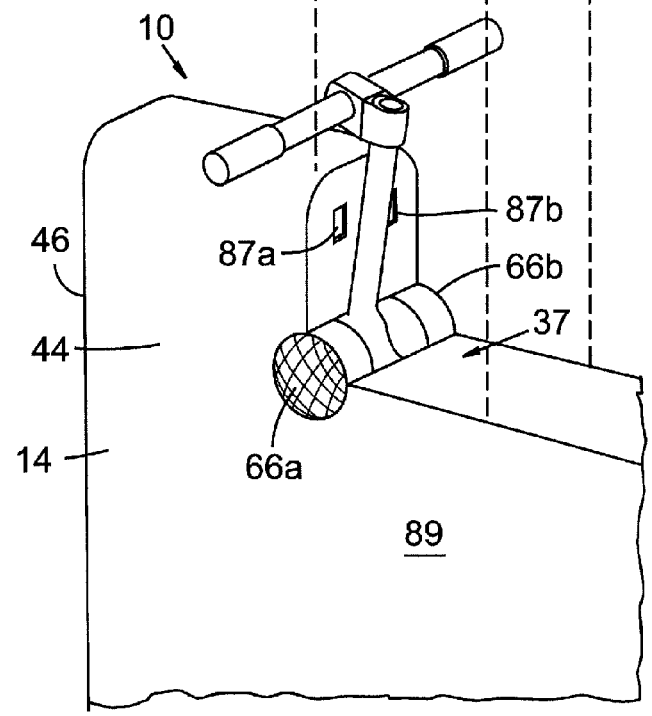
FIG. 15 is an isometric, rear, exploded view of the vehicle of FIG. 14 with the controller assembly shown exploded from the main body of the vehicle.
Figure 16:
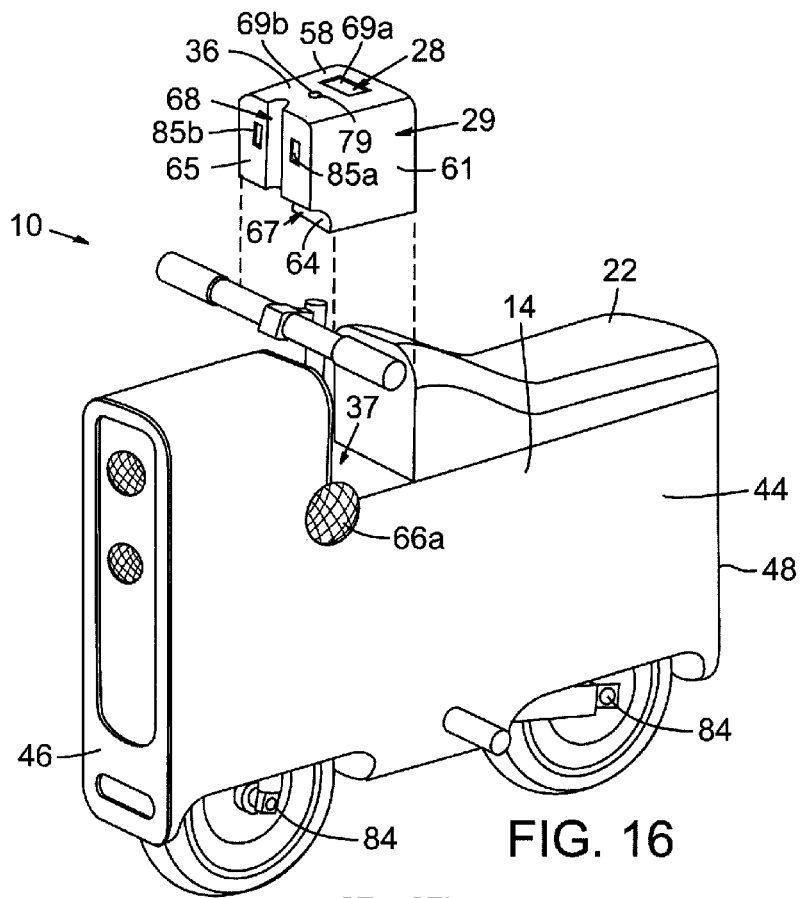
FIG. 16 is an isometric, front, exploded view of the vehicle of FIG. 14 with the controller assembly shown exploded from the main body of the vehicle.

As shown in FIGS. 14-16, the controller housing 36 can generally include a sidewall 61, a rear wall 63, a bottom wall 64, and a front wall 65. The sidewall 61 can have an inverted U-shape so as to extend between both sides and the top of the controller housing 36. The rear and front walls 63, 65 can be flat and can be attached to opposite ends of the sidewall 61. The bottom wall 64 can also extend between both bottom side edges of the sidewall 61 and between the rear and front walls 63, 65. The walls 61, 63, 64, 65 can be fixedly attached together (e.g., welded) along their respective edges such that the controller housing 36 is generally hollow and substantially cube-shaped.

The bottom wall 64 can include a quarter-circle-shaped cutout 67, which provides clearance for lights 66a, 66b on respective sides of the main body 14 of the vehicle 10. The front wall 65 can also include a rounded channel 68 that provides clearance for and allows rotation of a central shaft of the fork assembly 56 as shown in FIG. 14. Moreover, the upper surface of the sidewall 61 can include an opening 69a that exposes the display 28 and an opening 69b that exposes an ignition button 79. Still further, the rear wall 63 can include a handle opening 70, which provides enough clearance for the user's fingers or hand for grasping the control assembly 29. As such, the user can hold and transport the control assembly 29 by grasping the housing 36 by the handle opening 70.

Figure 17:
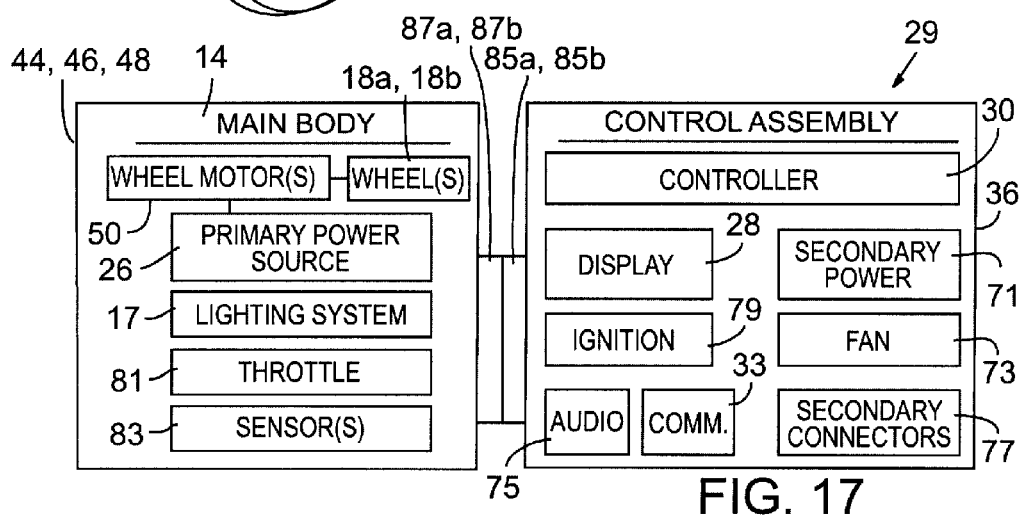
FIG. 17 is a schematic diagram of the vehicle of FIG. 14.

As shown schematically in FIG. 17, the controller housing 36 can house and can encapsulate the controller 30. The controller 30 can include one or more (e.g., four) printed circuit boards, a processor, memory (ROM and/or RAM), and other hardware or software for controlling components that are supported by the main body 14 of the vehicle 10. The controller 30 can also include expansion slots for adding additional circuit boards for increasing the capabilities of the controller 30. The controller housing 36 can further house a cooling device 73, such as a fan, that can provide cooling to the controller 30 and other components within the housing 36. The display 28 and ignition button 79 can be supported within the controller housing 36, and can be partially exposed through the sidewall 71 as mentioned above. The controller housing 36 can also include an audio device 75 for generating sounds (e.g., audible feedback, alarms, etc.) during use. The controller housing 36 can also house and encapsulate a secondary power source 71 (e.g., a battery, etc.) that can be used to independently power the controller 30, the display 28, the fan 73, and/or the audio device 75 when the controller housing 36 is detached from the main body 14 as will be discussed.

As discussed, above, the display 28 can display various messages and information about the vehicle 10. The display 28 can also be a touch-sensitive device for inputting control commands (e.g., by physically touching areas of the display 28 where icons are displayed). The display 28 can be touch-sensitive using any means (e.g., non-capacitive touch sensitive display). The display 28 can also be weather-proofed such that rain and other elements are unlikely to cause malfunction. Moreover, one or more solar cells 58 can extend about the opening 69a, about the display 28 to generate electricity for powering the vehicle 10. Additionally, the ignition button 79 (i.e., main power button) can be a touch-sensitive surface that the user can touch to turn the vehicle ON and OFF. It will be appreciated that the display 28 and/or the ignition button 79 can be configured in various other ways, and user commands could be input using other means, such as depressible buttons, levers, knobs, and the like. Also, although the touch-sensitive areas can incorporated directly within the display 28 and ignition button 79, the control assembly 29 can also include touch-sensitive areas that are separate from the display 28 and/or the ignition button 79.

Furthermore, as shown in FIG. 17, the control assembly 29 can include various connectors 77. For example, the connectors 77 can include USB ports, firewire, HDMI, RGB, and other types. The connectors 77 can be used for establishing electrical communication with external devices, and these connectors can be used for uploading information, downloading information, connecting with a cellular telephone, etc. The controller 30 can also be equipped with its own software (e.g., integrated communication engine) for upgrading or adding user features, diagnostics, and/or interfacing with other electrical devices such as portable electronic devices, cell phones, etc. via standard computer interfaces such as a USB port. Moreover, as mentioned above, the control assembly 29 can include a communications system 33 (FIG. 17), such as a Bluetooth or other wireless communications devices. Accordingly, the control assembly 29 can communicate (via wires or via wireless connections) with external devices. The control assembly 29 can likewise communicate with other control assemblies 29 of other vehicles 62a, 62b, 62n within a computerized network as illustrated in FIG. 10 and as discussed above.

In addition, as shown in FIGS. 16 and 17, the control assembly 29 can include one or more electrical connectors 85a, 85b. As shown in FIG. 16, the connectors 85a, 85b can be flat panels of electrically conductive material that are exposed in the front wall 65 of the controller housing 36, on opposite sides of the channel 68. As will be discussed, the connectors 85a, 85b can establish electrical connection (communication between the control assembly 29 and one or more components of the main body 14.

As shown in FIG. 16, the main body 14 can define an opening 37 that removably receives the control assembly 29. Specifically, the side panel and seat 20 can define a rectangular opening 37 that is adjacent and rearward of the handlebar shaft. Electrical connectors 87a, 87b (FIG. 15) can be exposed from the main body 14, within the opening 37, on opposite sides of the handlebar shaft.

The control assembly 29 can be removably attached to the main body 14 in any suitable fashion. For instance, to attach the control assembly 29, the controller housing 36 can be positioned above the opening 37 and moved linearly downward into the opening 37. Also, in some embodiments, once the seat 22 is pivoted upward, the control assembly 29 can be disposed rearward of the opening 37 and aligned with the opening 37; then the controller housing 36 can be moved linearly toward the handlebar shaft, until the front wall 65 abuts the main body 14.

The vehicle 10 can also include a latch or other coupling to retain the control assembly 29 on the main body. For instance, the main body 14 can include one or more retaining rails that project therefrom, and the controller housing 36 can include corresponding slot(s) that slideably receive the rail(s) for retaining the control assembly 29 on the main body 14. The controller housing 36 can also include retaining rails while the main body 14 includes corresponding slots. Other couplings could also be employed. Additional fasteners could also be included for removably retaining the control assembly 29 on the main body 14.

When attached, the controller housing 36 can be substantially flush with the main body 14. Specifically, the outer surface of the side panel of the main body 14 (the main body outer surface) can be substantially flush with the outer surface of the sidewall 61 of the controller housing 36 (the controller housing outer surface) as shown in FIG. 14. Accordingly, the outer surface of the side panel assembly 14, the outer surface of the sidewall 61, the rear wall the front panel 46, the rear panel 48, etc. can cooperate to define the overall exterior surface 89 of the vehicle 10 (FIG. 14). Thus, the vehicle 10 can be aesthetically pleasing and aerodynamic, even when the control assembly 29 is attached to the vehicle 10.

Moreover, when the control assembly 29 is removably attached to the main body 14, the connectors 85a, 85b of the control assembly 29 can abut and electrically connect with the connectors 87a, 87b of the main body 14, as represented schematically in FIG. 17. In some embodiments, the connectors 85a, 85b can be spring biased outward toward the connectors 87a, 87b, respectively to ensure contact and electrical connection. Also, in some embodiments, the connectors 87a, 87b can be biased outward toward the connectors 85a, 85b. It will also be appreciated the electrical connections between the connectors 85a, 85b, 87a, 87b can be severed (i.e., cut off) simply by lifting the control assembly 29 away from the main body 14. The connectors 85a, 85b or the connectors 87a, 87b can be a male connector while the others can be female connectors.

When electrically connected to the main body 14, the controller 30 can electrically communicate with the battery assembly 26 for controlling driving rotation of the wheels 18a, 18b as discussed above. For instance, the controller 30 can receive signals from the throttle/brake and accordingly regulate power distribution to each motor 50 for controlling the wheels 18a, 18b as discussed above. The controller 30 can also control the wheels 18a, 18b to provide traction control, anti-lock braking, etc. as discussed above. Also, the controller 30 can control the lighting system 17 (e.g., ON/OFF control of the lights, etc.). The controller 30 can additionally receive signals from one or more of the sensors 83 (e.g., rider sensor, speed sensor, etc.) discussed above for further controlling the vehicle 10.

When the control assembly 29 is removed from the main body 14, the control assembly 29 can be configured to operate independently. For instance, the secondary power supply 71 (FIG. 17) can power the control assembly 29 for powering the display 28, running the cooling device 73, etc. Also, the control assembly 29 can include a power cord for electrically connecting to an external power outlet, which can provide power. Also, a keyboard, a computer mouse, or other external input device can be connected to the control assembly 29 via the secondary connectors 77. Accordingly, the control assembly 29 can be operated independently, similar to a personal computer, such that the user can download software upgrades, can load music or other files on the control assembly 29, can communicate with other control assemblies 29 within a network, can program the controller 30, etc. Further, it will be appreciated that the controller 30 can have an independent operating system for operating the control assembly 29 in this manner, when separated from the main body 14. Additionally, the vehicle operating system software can load and run programs just as would be done with a personal computer. These programs may be certain applications for upgrading features of the vehicle 10, etc. Also, the control assembly 29 can connect to the server 60 to upload user information, vehicle information, performance information, etc.

In summary, the vehicle 10 can be extremely compact and lightweight, yet the vehicle 10 can be very safe and fun to ride. Also, the vehicle 10 has several modular features, which makes the vehicle very versatile. Additionally, the vehicle 10 can be manufactured efficiently and relatively inexpensively.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A two wheeled vehicle comprising:
a main body;
a first wheel that is coupled to the main body and that is rotatable relative to the main body;
a second wheel that is coupled to the main body and that is rotatable relative to the main body;
an electrical motor that is supported by the main body and that drives at least one of the first and second wheels in rotation relative to the main body;
a first electrical connector that is supported on the main body, the first electrical connector being electrically connected with the electrical motor; and
a controller assembly including a controller, a second electrical connector, and a controller housing, the controller being encapsulated within the controller housing, the second electrical connector being exposed from the controller housing, the second electrical connector electrically connected with the controller, the controller assembly having a first position and a second position relative to the main body, the controller assembly being supported on the main body when in the first position, the controller assembly being spaced apart from the main body when in the second position, the first electrical connector and the second electrical connector being electrically connected when in the first position, the first electrical connector and the second electrical connector being electrically disconnected when in the second position, the controller and the motor being in severable but operable communication when in the first position.

2. The two wheeled vehicle of claim 1, wherein at least one of the first electrical connector and the second electrical connector is biased toward the other of the first electrical connector and the second electrical connector when in the first position.

3. The two wheeled vehicle of claim 1, further comprising a lighting system that is supported by the main body, the controller operable to control the lighting system when in the first position.

4. The two wheeled vehicle of claim 1, further comprising an electrical power source that is supported by the main body and that provides electrical power to the motor, the first and second electrical connectors electrically connected with each other when in the first position to allow electrical connection between the controller and the electrical power source, the controller operable to regulate electrical power from the electrical power source to the motor when in the first position.

5. The two wheeled vehicle of claim 1, further comprising a throttle that is supported by the main body, the throttle being operable for selectively regulating output of the electrical motor, the first and second electrical connectors electrically connected with each other when in the first position to establish electrical connection between the controller and the throttle.

6. The two wheeled vehicle of claim 1, wherein the controller assembly further includes a display and an input device for inputting a control command to the controller, the display and the input device being exposed from the controller housing.

7. The two wheeled vehicle of claim 6, wherein the input device is a touch-sensitive input device for inputting the control command by physically touching the touch-sensitive input device.

8. The two wheeled vehicle of claim 7, wherein the touch-sensitive input device is incorporated within the display.

9. The two wheeled vehicle of claim 1, wherein the two wheeled vehicle includes an exterior surface, wherein the main body includes a main body outer surface, wherein the controller housing includes a controller housing outer surface, the main body outer surface and the controller housing outer surface cooperating to the define the exterior surface of the two wheeled vehicle when in the first position.

10. The two wheeled vehicle of claim 9, wherein the controller housing outer surface is substantially flush with the main body outer surface when the controller assembly is in the first position.

11. The two wheeled vehicle of claim 1, wherein the controller assembly is operable to communicate within a computerized network of a plurality of other controller assemblies.

12. The two wheeled vehicle of claim 4, wherein the controller assembly further includes a secondary electrical power source and a component that are each supported by the controller housing, the secondary electrical power source being operable to provide power to the component when the controller assembly is in the second position, the component being operable to be controlled by the controller when the controller assembly is in the second position.

13. The two wheeled vehicle of claim 1, further comprising a cooling device that is supported by the controller housing, the cooling device operable to cool the controller.

14. The two wheeled vehicle of claim 1, further comprising an audio device that is supported by the controller housing, the audio device operable to generate a sound.

15. The two wheeled vehicle of claim 1, wherein the controller assembly further includes a handle operable for holding and transporting the controller assembly when in the second position.

16. The two wheeled vehicle of claim 12, wherein the component is a display that is exposed from the controller housing.

17. The two wheeled vehicle of claim 1, wherein the controller assembly is a first controller assembly, further comprising a second controller assembly, the first and second controller assemblies each including a respective controller, a respective second electrical connector, and a respective controller housing that encapsulates the respective controller and that exposes the respective second electrical connector,
    wherein the main body includes an opening configured to receive the first controller assembly in a first configuration and to alternatively receive the second controller assembly in a second configuration,
    the first electrical connector electrically connected with the second electrical connector of the first controller assembly in the first configuration to allow the controller of the first controller assembly to control the electrical motor, and
    the first electrical connector electrically connected with the second electrical connector of the second controller assembly in the second configuration to allow the controller of the second controller assembly to control the electrical motor.

18. The two wheeled vehicle of claim 17, further comprising an electrical power source that is supported by the main body and that provides electrical power to the motor, the controller of the first controller assembly operable to regulate electrical power from the electrical power source to the motor when in the first configuration, the controller of the second controller assembly operable to regulate electrical power from the electrical power source to the motor when in the second configuration.

19. The two wheeled vehicle of claim 18, wherein the first controller assembly and the second controller assembly each include a respective secondary electrical power source and a respective component that are each supported by the respective controller housing, the secondary electrical power source being operable to provide power to the respective component, the controller being operable to control the respective component.

20. The two wheeled vehicle of claim 19, wherein the component is a display that is exposed from the respective controller housing.

* * * * *